(12) United States Patent
Hayakawa et al.

(10) Patent No.: US 9,452,503 B2
(45) Date of Patent: Sep. 27, 2016

(54) GREEN BALL GRINDING METHOD, CERAMIC SPHERE FABRICATION METHOD, AND GRINDING APPARATUS

(71) Applicants: Yasutake Hayakawa, Kuwana (JP); Katsutoshi Muramatsu, Kuwana (JP)

(72) Inventors: Yasutake Hayakawa, Kuwana (JP); Katsutoshi Muramatsu, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/704,620

(22) Filed: May 5, 2015

(65) Prior Publication Data
US 2015/0231754 A1      Aug. 20, 2015

Related U.S. Application Data

(62) Division of application No. 13/499,158, filed as application No. PCT/JP2010/066371 on Sep. 22, 2010, now Pat. No. 9,032,626.

(30) Foreign Application Priority Data

Sep. 29, 2009   (JP) ................. 2009-224774
Sep. 29, 2009   (JP) ................. 2009-224792
Aug. 13, 2010   (JP) ................. 2010-181283

(51) Int. Cl.
*B24B 1/00*       (2006.01)
*B24B 11/00*      (2006.01)
(Continued)

(52) U.S. Cl.
CPC ............. *B24B 11/06* (2013.01); *B21H 1/14* (2013.01); *B21K 1/02* (2013.01); *B23P 17/04* (2013.01); *B24B 5/36* (2013.01); *Y10T 29/49712* (2015.01)

(58) Field of Classification Search
CPC ........ B21B 1/00; B21D 51/00; B21D 51/08; B24B 1/00; B24B 5/00; B24B 5/36; B24B 9/00; B24B 11/00; B24B 11/02; B24B 11/04; B24B 11/06; B23P 15/003; B23P 17/00; B23P 17/04; B23P 25/00; B23Q 39/00; B23Q 39/02; B21H 1/00; B21H 1/14; B28B 11/00; B28B 11/08; B28B 17/0009; B28B 17/04; B21K 1/02; B29C 37/02
USPC .............. 29/57, 458, 558, 898.052, 898.069; 451/55, 262, 267, 50; 264/162; 72/365.2
See application file for complete search history.

(56) References Cited

U.S. PATENT DOCUMENTS 3,104,502 A       9/1963   Burch
3,545,139 A *   12/1970   Brany ........................... 451/50
(Continued)

FOREIGN PATENT DOCUMENTS

CN           1586814 A       3/2005
CN         101518886 A       9/2009
(Continued)

OTHER PUBLICATIONS

Notice of Allowance issued in Japanese Application No. 2010-181283 dated Sep. 9, 2014 w/English translation.
(Continued)

*Primary Examiner* — Sarang Afzali
*Assistant Examiner* — Darrell C Ford
(74) *Attorney, Agent, or Firm* — McDermott Will & Emery LLP

(57) ABSTRACT

A green ball grinding method includes the step of supplying a green ball between a first surface of a first member and a second surface of a second member constituting a grinding apparatus, and the step of grinding the green ball between the first surface and the second surface while the green ball rotates around its own axis and in orbital motion. In the step of grinding the green ball, the step of causing the green ball grinding to proceed while applying load between the green ball and each of the first surface and the second surface, and the step of modifying the rotation axis of the green ball by reducing the load lower than in the step of causing the green ball grinding to proceed are executed alternately.

1 Claim, 15 Drawing Sheets

(51) Int. Cl.
*B28B 11/18* (2006.01)
*B28B 17/00* (2006.01)
*B24B 11/06* (2006.01)
*B21H 1/14* (2006.01)
*B21K 1/02* (2006.01)
*B23P 17/04* (2006.01)
*B24B 5/36* (2006.01)

(56) References Cited

U.S. PATENT DOCUMENTS

| | | | |
|---|---|---|---|
| 3,547,796 A | | 12/1970 | Randall |
| 3,847,000 A | | 11/1974 | Teague |
| 3,924,356 A | | 12/1975 | Kitchel |
| 3,978,566 A | * | 9/1976 | Ladin .................. 29/898.066 |
| 3,999,330 A | | 12/1976 | Brany |
| 4,741,632 A | | 5/1988 | Jacobson |
| 4,965,967 A | | 10/1990 | London |
| 5,214,884 A | | 6/1993 | Kinoshita et al. |
| 5,584,749 A | | 12/1996 | Mitsuhashi et al. |
| 5,906,535 A | | 5/1999 | Tonooka et al. |
| 5,913,717 A | * | 6/1999 | Tonooka et al. ............ 451/282 |
| 5,931,718 A | * | 8/1999 | Komanduri et al. ......... 451/36 |
| 5,961,907 A | | 10/1999 | Yamagiwa et al. |
| 6,165,054 A | * | 12/2000 | Abe et al. .................. 451/262 |
| 6,171,179 B1 | | 1/2001 | Chiou et al. |
| 6,200,413 B1 | * | 3/2001 | Privitt et al. ............ 156/345.12 |
| 6,206,772 B1 | * | 3/2001 | Davis ........................... 451/385 |
| 6,745,472 B2 | | 6/2004 | Fujita et al. |
| 7,356,927 B2 | | 4/2008 | Chung |
| 7,618,569 B2 | * | 11/2009 | Sugimoto .................... 264/161 |
| 7,722,440 B2 | | 5/2010 | Potzsch et al. |
| 8,613,643 B2 | | 12/2013 | Sugitatsu |
| 8,800,129 B2 | | 8/2014 | Osterlanger et al. |
| 2005/0090190 A1 | | 4/2005 | Rudolph |
| 2005/0230508 A1 | | 10/2005 | Chang |
| 2006/0111029 A1 | * | 5/2006 | Sim ............................. 451/491 |
| 2008/0171492 A1 | * | 7/2008 | Potzsch et al. ................. 451/41 |
| 2011/0177760 A1 | | 7/2011 | Tanaka et al. |
| 2012/0180317 A1 | * | 7/2012 | Hayakawa et al. ........... 29/899 |

FOREIGN PATENT DOCUMENTS

| | | |
|---|---|---|
| DE | 4388746 | 12/1926 |
| DE | 4007780 A1 | 9/1991 |
| DE | 19816252 A1 | 4/1999 |
| JP | 1-130908 | 12/1926 |
| JP | 47-1948 | 1/1972 |
| JP | 59-14461 A | 1/1984 |
| JP | 2-303767 | 12/1990 |
| JP | 4-67964 | 6/1992 |
| JP | 4-183567 | 6/1992 |
| JP | 7-314308 | 12/1995 |
| JP | H08192361 A | 7/1996 |
| JP | 11-300605 | 11/1999 |
| JP | 2000-317816 A | 11/2000 |
| JP | 2004-009296 A | 1/2004 |
| JP | 2008-254082 A | 10/2008 |
| JP | 2009-072871 A | 4/2009 |
| TW | 427232 U | 3/2001 |

OTHER PUBLICATIONS

Supplementary European Search Report EP Application No. 10820415.7 dated Apr. 14, 2014.
Chinese Office Action issued in Chinese Application No. 201080044758.5 dated Feb. 18, 2014 with English translation.
Japanese Office Action received in Application No. 2009-224792 dated Dec. 10, 2013.
Notice of Grounds of Rejection Japanese Patent Application No. 2009-224774 dated Sep. 10, 2013.
Japanese Office Action issued in Application No. 2009-224774 dated Jul. 2, 2013.
English Translation of JP H07-314308 (Machine Translation).
Non-Final Office Action with Restriction Requirement U.S. Appl. No. 13/499,159 dated May 10, 2013.
Non-Final Office Action U.S. Appl. No. 13/499,158 dated Jul. 3, 2013.
Final Office Action U.S. Appl. No. 13/499,158 dated Nov. 5, 2013.
Advisory Action U.S. Appl. No. 131499,158 dated Mar. 6, 2014.
Non-Final Office Action U.S. Appl. No. 13/499,158 dated May 23, 2014.
Final Office Action U.S. Appl. No. 13/499,158 dated Sep. 10, 2014.
Notice of Allowance U.S. Appl. No. 13/499,158 dated Jan. 20, 2015.

* cited by examiner

GREEN BALL GRINDING METHOD, CERAMIC SPHERE FABRICATION METHOD, AND GRINDING APPARATUS

CROSS-REFERENCE TO RELATED APPLICATIONS

This application is a Divisional application of U.S. Ser. No. 13/499,158, filed Mar. 29, 2012, now U.S. Pat. No. 9,032,626, which is the U.S. National Phase under 35 U.S.C. §371 of International Application No. PCT/JP2010/066371, filed on Sep. 22, 2010, which in turn claims the benefit of Japanese Application Nos. 2009-224774, filed on Sep. 29, 2009, 2009-224792, filed on Sep. 29, 2009 and 2010-181283, filed on Aug. 13, 2010. The disclosures of each is incorporated herein by reference in entirety.

TECHNICAL FIELD

The present invention relates to a green ball grinding method, a ceramic sphere fabrication method, and a grinding apparatus. More particularly, the present invention relates to a green ball grinding method, a ceramic sphere fabrication method, and a grinding apparatus, allowing the sphericity of the green ball to be improved.

BACKGROUND ART

A ball made of ceramic (ceramic sphere) used as the rolling element or the like in a rolling bearing is fabricated by molding raw material powder to form an unsintered ball of ceramic, i.e. a green ball, sintering the same, followed by a grinding process to finish a ceramic sphere having a shape close to a true sphere. However, there is a problem that the processing is time consuming due to the extremely high hardness of the ceramic sphere.

A green ball prior to sintering is readily worked by virtue of its low hardness. A ball can be processed with efficiency significantly higher than that of grinding after sintering. In view of the foregoing, various proposals have been made in the working of a green ball (for example, refer to Japanese Patent Laying-Open No. 1-130908 (PTL 1), Japanese Patent Laying-Open No. 2-303767 (PTL 2), and Japanese Patent Laying-Open No. 7-314308 (PTL 3). PTL 1 discloses a method including the steps of sandwiching a green ball having a composition based mainly on thermoplastic organic polymer compound added as a binder between two plates facing each other, dropping abrasives and water down onto the grinding plate to carry out wet type grinding. However, this method is disadvantageous in that the composition of the binder is restricted. This method also has a problem in mass productivity since the degreasing and sintering conditions after processing are complex. PTL 2 discloses a method of grinding by sandwiching a green ball between two vertical grindstones. However, this problem has a problem in mass productivity since a plurality of green balls cannot be worked simultaneously by one apparatus.

PTL 3 discloses a method of grinding, including the steps of sandwiching a plurality of green balls between a pair of working plates that are flat and face each other, and grinding the green balls to a shape close a true sphere while causing each of the green balls to rotate in orbital motion and around its own axis in self-rotation in various directions by the relative displacement of a plurality of lines along the opposite planes of the two working plates. A relative displacement of a plurality of lines implies rotation of the two working plates decentered relative to each other, a combination of rotation and straight forward advancement, and the like. According to the working apparatus, the rough surface directed to grinding at the lower working plate can be formed of an open-meshed rough faced constituent member having a mesh that allows passage of ground particles, and a plurality of holes that open upwards can be provided at the lower working plate region of the rough faced constituent member. This method does not have the component of the binder restricted, and allows processing of a plurality of balls at the same time.

CITATION LIST

Patent Literature

PTL 1: Japanese Patent Laying-Open No. 1-130908
PTL 2: Japanese Patent Laying-Open No. 2-303767
PTL 3: Japanese Patent Laying-Open No. 7-314308

SUMMARY OF INVENTION

Technical Problem

The green ball grinding method disclosed in PTL 3 has the modification in the self-rotating direction of the green ball restricted since the green ball is continuously restrained by the upper and lower working plates. Therefore, the green balls are not worked isotropically, leading to the possibility of insufficient sphericity.

An object of the present invention is to provide a green ball grinding method, a ceramic sphere fabrication method, and a grinding apparatus that allows the sphericity of a green ball to be improved sufficiently by realizing isotropic working.

It is to be also noted that the green ball grinding apparatus of PTL 3 induces the possibility of degradation in the grinding efficiency since the mesh of the rough faced constituent member and/or the hole provided at the working plate may be clogged by the ground particles generated by grinding the green ball.

Therefore, another object of the present invention is to provide a green ball grinding apparatus that can suppress degradation in the grinding efficiency and that can realize grinding of a green ball efficiently.

In the invention disclosed in PTL 3, a plurality of green balls can be worked simultaneously since working is carried out with a plurality of green balls sandwiched. However, the task of sandwiching the plurality of green balls is time consuming since the green balls are held against the upper working plate after being placed at a relevant sandwiching region on the lower working plate.

Following the grinding process of the plurality of green balls, the next new set of green balls are placed at the sandwiching region of the lower working plate after the previous set of green balls subjected to grinding are removed from the working apparatus. Therefore, the process of removing the set of green balls subjected to grinding from the working apparatus, and placing a new set of green balls on the lower working plate is time consuming. Thus, high mass productivity cannot be achieved by the invention of PTL 3.

Therefore, a further object of the present invention is to provide a green ball working apparatus and green ball working method of high mass productivity.

Solution to Problem

A green ball grinding method of the present invention includes the steps of supplying a green ball between a first surface of a first member and a second surface of a second member constituting a grinding apparatus, and grinding the green ball between the first surface and the second surface while the green ball rotates around its own axis and in orbital motion. In the step of grinding a green ball, the step of causing green ball grinding to proceed while applying load between the green ball and the first and second surfaces, and the step of modifying the rotation axis of the green ball by reducing the load lower than in the step of causing green ball grinding to proceed are executed alternately.

In the green ball grinding method of the present invention, the green ball rotates around its own axis in self-rotation and in orbital motion at the step of grinding a green ball. In the step of causing green ball grinding to proceed, the green ball is ground while load is applied between the green ball and the first and second surfaces. At this stage, the rotation axis cannot be moved greatly since the green ball is restrained by the first and second surfaces. In this step, the green ball tends to be worked, not in the shape of a true sphere, but in a relatively flattened shape having a long axis in the direction along the plane of revolution. In the step of modifying the rotation axis of the green ball, the green ball that is rotating around its own axis and in orbital motion erects by the gyroscopic precession such that the long axis corresponds to its own rotation axis since the restraint by the first and second surfaces is alleviated. When the step of causing green ball grinding to proceed is carried out again, the green ball is worked in the direction of the long axis.

In other words, the step of the green ball erecting such that the long axis corresponds to the rotation axis and the step of the green ball being worked in the direction of the long axis are carried out alternately in the step of grinding the green ball, according to the green ball grinding method of the present invention. Therefore, higher sphericity can be achieved as compared to the conventional grinding method in which the modification in the self-rotating direction of the green ball is restrained since the green ball is continuously restrained by the upper and lower working plates. According to the green ball grinding method of the present invention, the sphericity of the green ball can be improved sufficiently by realizing isotropic working.

In the step of modifying the rotation axis of the green ball, the load between the green ball and the first and second surfaces is preferably substantially 0. Accordingly, modification in the rotation axis by the gyroscopic precession can be readily realized. As used herein, a state of the load being substantially 0 refers to the state where there is a clearance between the green ball and one of the first and second surfaces, such that the restraint on the green ball by the first and second surfaces is canceled, or the state where the green ball forms contact with the first and second surfaces, but not having load applied to a level contributing to the progress of green ball grinding from the standpoint of mass productivity.

In the step of modifying the rotation axis of the green ball in the green ball grinding method set forth above, the rotation axis may be modified by controlling the load of the first and second surfaces on the green ball.

In the step of modifying the rotation axis of the green ball in the green ball grinding method set forth above, the rotation axis may be modified by controlling the distance between the first and second surfaces.

Thus, by controlling the load of the first and second surfaces on the green ball and/or controlling the distance between the first and second surfaces, the step of causing green ball grinding to proceed and the step of modifying the rotation axis can be executed readily in repetition.

The green ball grinding method set forth above may be carried out such that the first and second members constitute a distance changing region where the distance between the first and second surfaces is greater than an adjacent region in the step of grinding the green ball, and such that the rotation axis of the green ball is modified by the entry of the green ball into the distance changing region in the step of modifying, the rotation axis of the green ball.

By forming a distance changing region, the step of causing green ball grinding to proceed and the step of modifying the rotation axis can be executed readily in repetition without intentionally controlling the distance between the first and second surfaces and the load of the first and second surfaces on the green ball set forth above.

A ceramic sphere fabrication method according to the present invention includes the steps of preparing a green ball, carrying out grinding of the green ball, and subjecting the ground green ball to a sintering process. The grinding of a green ball is carried out by the green ball grinding method of the present invention set forth above.

Since a green ball can be ground by the green ball grinding method of the present invention set forth above according to the ceramic sphere fabrication method of the present invention, a ceramic sphere of high sphericity can be readily fabricated.

A green ball grinding apparatus according to an aspect of the present invention is directed to carrying out grinding of a green ball while sandwiching the green ball between first and second members. The first member has a first surface. The second member has a second surface facing the first surface. The green ball is sandwiched between the first and second surfaces. At least one of the first and second surfaces includes a greater distance region where the distance from the other of the first and second surfaces is greater than that of an adjacent region.

Since at least one of the first and second surfaces includes a greater distance region according to the green ball grinding apparatus of one aspect of the present invention, a distance changing region where the distance between the first and second surfaces is greater than that of an adjacent region is formed between the first and second surfaces. Therefore, according to the grinding apparatus of the present invention, the step of causing green ball grinding to proceed and the step of modifying the rotation axis can be executed readily in repetition without having to intentionally control the distance between the first and second surfaces and the load of the first and second surfaces on the green ball.

A green ball grinding apparatus according to another aspect of the present invention includes a first member having a first surface, retaining a green ball by forming contact therewith, and a second member having a second surface facing the first surface, and retaining a green ball by forming contact therewith, and also a retainer restricting movement of the green ball in a direction along the second surface by protruding in a direction crossing the second surface. At least one of the first and second surfaces is a grinding face for grinding a green ball by forming contact therewith. The green ball grinding apparatus further includes a ground particle removal mechanism for removing the ground particles generated by grinding the green ball off from the grinding face. The green ball is sandwiched between the first and second surfaces. The first and second members cause the green ball to rotate in orbital motion and around its own axis by the relative displacement of a plurality of lines.

In the green ball grinding apparatus according to another aspect of the present invention, the first and second members causes the green ball to rotate in orbital motion and around its own axis by the relative displacement of a plurality of lines. Therefore, the green ball rotates around its own axis while the rotation axis is modified. Furthermore, at least one of the first and second surfaces is a grinding face. Therefore, the green ball has its projection worked with priority by the self-rotation, allowing grinding over the entirety of the surface. As a result, the green ball approaches a true sphere more efficiently by the grinding through the grinding apparatus. Furthermore, since the green ball grinding apparatus of the present invention includes a ground particle removal mechanism for removing the ground particles from the grinding face, clogging at the grinding face is suppressed and degradation in the grinding efficiency is suppressed. Therefore, a grinding work of favorable efficiency can be maintained over a long a period of time. According to the green ball grinding apparatus of the present invention, degradation in the grinding efficiency can be suppressed. There can be provided a green ball grinding method that can carry out grinding of the green ball efficiently. The relative displacement of a plurality of lines implies rotation of the first and second members about an axis differing from each other, a combination of rotation of one of the members and straight forward advancement of the other member.

In the green ball grinding apparatus set forth above, the ground particle removal mechanism may include a suction member that removes ground particles by suction. Accordingly, removal of the ground particles from the grinding face can be carried out efficiently.

In the green ball grinding apparatus set forth above, the ground particle removal mechanism may include a cleaning member for cleaning the grinding face by supplying a cleaning solution to the grinding face, and a drying member drying the cleaned grinding face.

Accordingly, by removing the ground particles from the grinding face more reliably using a cleaning solution and drying the grinding face after removing the ground particles, the adverse effect of the remaining cleaning solution on the grinding of the green ball can be suppressed.

In the green ball grinding apparatus set forth above, the ground particle removal mechanism may include a gas spraying member removing ground particles by spraying gas to the grinding face. Accordingly, the ground particles can be removed more reliably from the grinding face.

In the green ball grinding apparatus set forth above, a region of at least one of the first member and second member including a grinding face may be formed of a lattice member having a lattice form of a mesh through which ground particles can pass. Since the generated ground particles can pass through the mesh of the lattice member, clogging at the grinding face can be suppressed as compared to the case where a general grindstone is used.

In the green ball grinding apparatus set forth above, at least one of the first member and second member including a grinding face may have a plurality of holes that open towards the lattice member formed immediately below the lattice member. Accordingly, clogging at the grinding face is further suppressed since the ground particles passing through the mesh of the lattice member enter the holes.

In the green ball grinding apparatus set forth above, the plurality of holes may be formed to penetrate at least one of the first and second members having a grinding face in a direction crossing the grinding face.

Accordingly, the ground particles passing through the mesh of the lattice member and entering the holes can pass through the hole to be removed from the other side. Thus, the clogging at the grinding face can be further suppressed.

In the green ball grinding apparatus set forth above, a suction member and a gas spraying member may be arranged so as to sandwich at least one of the first and second members including a grinding face in the penetrating direction of the plurality of holes.

Accordingly, gas is sprayed by the gas spraying member from one open side to the plurality of holes formed at at least one of the first and second members including the grinding face, and the ground particles are drawn out by the suction member from the other open side. Thus, ground particles are removed. As a result, clogging at the grinding face can be suppressed further reliably.

A green ball working apparatus of the present invention is directed to grinding a plurality of green balls. The green ball working apparatus includes a lower working plate having a first plane, and an upper working plate arranged above the lower working plate, having a second plane facing the first plane, rotatable relative to the lower working plate, and capable of moving up and down relative to the lower working plate between a first height position and a second height position higher than the first height position. With the upper working plate in a state located at the first height position, the upper working plate and the lower working plate define an interior space between the first plane and second plane to sandwich a green ball. The upper working plate includes an insertion section for introducing a green ball to the interior space at the first height position. The upper working plate and the lower working plate are configured such that the green ball can be retained in the interior space with the upper working plate in a state located at the first height position, and the green ball can be discharged from the space between the upper working plate and the lower working plate with the upper working plate in the state located at the second height position. The lower working plate includes a discharge section for discharging the green ball from the first plane of the lower working plate. The discharge section is configured outside the range of the interior space.

The green ball working apparatus of the present invention is configured such that the green ball can be retained in the inner interior space with the upper working plate in the state at the first height position, and the upper working plate and the lower working plate can discharge the green ball from the space between the upper working plate and the lower working plate with the upper working plate in a state located at the second height position. Accordingly, a new set of green balls can be ground at the interior space by the upper working plate moving to the first height position with the previous plurality of green balls subjected to grinding being discharge from the space between the upper working plate and lower working plate by the upper working plate moving to the second height position. Accordingly, the discharge of the set of green balls subjected to grinding from the space between the upper working plate and lower working plate and the grinding of the new set of green balls in the interior space can be carried out simultaneously. Since a plurality of green balls can be ground continuously, the amount of green balls subjected to grinding can be increased. Thus, the mass productivity can be improved.

Since the discharge section is configured outside the range of the interior space, a new set of green balls can be ground at the interior space while the previous set of green balls subjected to grinding are discharged from the discharge section. Furthermore, since the lower working plate includes a discharge section for discharging the green ball from the first plane of the lower working plate, the set of green balls subjected to grinding can be automatically discharged from the lower working plate 2. It is therefore not necessary to stop the lower working plate in order to remove the set of green balls subjected to grinding from the lower working plate. Since a plurality of green balls can be ground continuously, the amount of green balls subjected to grinding can be increased. Thus, the mass productivity can be improved.

With the upper working plate in a state located at the first height position, a green ball is introduced in the interior space through the insertion section to be retained therein. Since a plurality of green balls are inserted under a state where the interior space is formed, the plurality of green balls can be sandwiched rapidly in the interior space. Accordingly, the time required for sandwiching the plurality of green balls in the interior space can be shortened. Thus, the mass productivity can be improved.

Preferably in the green ball working apparatus set forth above, the insertion section includes an insertion through hole provided at the upper working plate to allow passage of a green ball prior to grinding through the upper working plate. Accordingly, a green ball can be inserted quickly into the interior space since the insertion through hole is a through hole. Therefore, the mass productivity can be improved.

Preferably in the green ball working apparatus set forth above, the insertion through hole is formed in the rotary shaft of the upper working plate. Accordingly, the green ball inserted into the interior space moves from the location between the insertion through hole formed in the rotary shaft and the first plane to the inner circumference of the upper guide wall by the centrifugal force. Therefore, a plurality of green balls will not be stranded at the location between the insertion through hole formed in the rotary shaft and the first plane. Since the insertion through hole is formed at a position where a plurality of green balls will not be stranded, the insertion through holes does not impede the grinding work. Therefore, the efficiency of the grinding work is not degraded by the insertion through hole. Thus, the mass productivity can be improved.

Preferably in the green ball working apparatus set forth above, the insertion through hole is formed at the outer perimeter side relative to the rotary shaft of the upper working plate. Accordingly, the rotary shaft of the upper working plate can be made thinner. Therefore, the upper working plate can be reduced in weight, allowing the rotational speed of the upper working plate to be increased. Thus, the mass productivity can be improved.

Preferably in the green ball working apparatus set forth above, the insertion through hole includes a first through hole formed in the rotary shaft of the upper working plate, and a second through hole formed at the outer perimeter side of the rotary shaft. Therefore, a plurality of green balls can be inserted into the interior space from both the first and second through holes, allowing rapid insertion of green balls into the interior space. Thus, the mass productivity can be improved.

Preferably in the green ball working apparatus set forth above, the insertion through hole is formed to extend oblique to the first plane. Accordingly, a green ball is inserted into the interior space at an angle oblique to the first plane. Therefore, the green ball previously inserted in the interior space is pushed by the next green ball inserted into the interior space to move in a direction along the first plane. Furthermore, the green ball inserted into the interior space readily moves to the upper guide wall.

Therefore, the jamming of the green ball at the location between the insertion through hole and the first plane can be suppressed even in the case where the diameter of the insertion through hole is small. Therefore, the efficiency of inserting a green ball can be improved. Thus, the mass productivity can be improved.

Preferably in the green ball working apparatus set forth above, the insertion through hole is of a circular shape having a diameter greater than two times the diameter of the green ball. Therefore, even in the case where two balls are inserted at the same time into the insertion through hole, the green balls will not be jammed in the insertion through hole. Accordingly, the time required for inserting green balls into the interior space can be shortened. Thus, the mass productivity can be improved.

Preferably in the green ball working apparatus set forth above, the discharge section includes a discharge through hole provided at the lower working plate to allow passage of a green ball subjected to grinding through the lower working plate. Accordingly, the discharge through hole allows a green hole to be discharged quickly from the discharge section by virtue of being a through hole. Thus, mass productivity can be improved.

Preferably in the green ball working apparatus set forth above, the discharge section includes a valley that is recessed relative to the first plane. The valley is configured to guide a green ball to the discharge through hole. Since a plurality of green balls are guided to the discharge through hole in series by the valley, the jamming of green balls at the discharge section can be prevented. Therefore, the discharge efficiency of green balls can be improved. Thus, the mass productivity can be improved.

Preferably in the green ball working apparatus set forth above, both the upper working plate and the lower working plate are configured to rotate. Accordingly, the grinding of a plurality of green balls and the discharge of green balls subjected to grinding out from the space between the upper and lower working plates can be carried out independently. Therefore, the grinding and discharge efficiency of a plurality of green balls can be improved. Thus, the mass productivity can be improved.

Preferably in the green ball working apparatus set forth above, the upper working plate and the lower working plate are configured such that the rotation center of the upper working plate and the rotation center of the lower working plate are decentered. Therefore, the plurality of green balls sandwiched between the upper and lower working plates can rotate around its own axis in every direction. Therefore, the plurality of green balls can be ground in a short period of time. Thus, the mass productivity can be improved.

Preferably in the green ball working apparatus set forth above, the lower working plate includes a hole for discharging ground particles generated as a result of the green ball being ground out from the interior space. Accordingly, the clogging of the ground particles in the interior space can be prevented. Therefore, the grinding efficiency of the plurality of green balls can be improved. Thus, the mass productivity can be improved.

A green ball working method of the present invention includes the steps of sandwiching a plurality of green balls inserted in the interior space defined by the upper and lower working plates and grinding the plurality of green balls by rotating the upper working plate relative to the lower working plate, and guiding the plurality of green balls subjected to grinding in a state discharged from the interior space to the lower working plate, to a discharge section for discharging the plurality of green balls subjected to grinding from the lower working plate while sandwiching a new set of green balls at the interior space and rotating the upper working plate relative to the lower working plate to grind the new set of green balls.

According to the green ball working method of the present embodiment, a plurality of green balls subjected to grinding in a state discharged from the interior space to the lower working plate are guided to the discharge section while a new set of green balls are sandwiched at the interior space to be ground. Therefore, additional green balls can be ground at the interior space while guiding the previous plurality of green balls subjected to grinding to the discharge section. Since a plurality of green balls can be ground continuously, the amount of green balls subjected to grinding can be increased. Thus, the mass productivity can be improved.

Preferably in the green ball working method set forth above, a through hole communicating with the interior space is formed in the upper working plate. A plurality of green balls are inserted into the interior space through the through hole. The discharge section includes a discharge hole formed outside the range of the interior space. A plurality of green balls subjected to grinding are discharged from the lower working plate through the discharge hole.

Since a plurality of green balls are inserted into the interior space through the through hole, insertion of green balls into the interior space can be carried out rapidly through the through hole. Furthermore, since a plurality of green balls are inserted in the interior space, the time required to sandwich the plurality of green balls in the interior space can be shortened. Thus, the mass productivity can be improved.

The discharge section includes a discharge hole formed outside the range of the interior space. Since a plurality of green balls subjected to grinding are discharged from the lower working plate through the discharge hole, the green balls subjected to grinding can be discharged from the discharge section while additional green balls are ground at the interior space. Since a plurality of green balls can be ground continuously, the amount of green balls ground subjected to grinding can be increased. Thus, the mass productivity can be improved.

Furthermore, the plurality of green balls subjected to grinding can be discharged automatically from the lower working plate. Therefore, the lower working plate does not have to be stopped in order to remove the green balls subjected to grinding from the lower working plate. Accordingly, a plurality of green balls can be ground continuously, allowing the amount of green balls subjected to grinding to be increased. Thus, the mass productivity can be improved.

Preferably in the green ball working method set forth above, a plurality of green balls subjected to grinding can be discharged from the interior space by moving the upper working plate upwards relative to the lower working plate, and additional green balls can be sandwiched in the interior space by moving the upper working plate downwards relative to the lower working plate.

By moving the upper working plate upwards and downwards relative to the lower working plate, green balls subjected to grinding can be discharged from the interior space while additional green balls are sandwiched in the interior space. Therefore, the discharge of a plurality of green balls from the interior space and the sandwiching of a plurality of green balls in the interior space can be carried out rapidly. Thus, the mass productivity can be improved.

Preferably in the green ball working method set forth above, both the upper working plate and lower working plate rotate. By virtue of the rotation of both the upper and lower working plates, the grinding of a plurality of green balls and the discharging of green balls subjected to grinding out from the space between the upper and lower working plates can be carried out independently. Therefore, the grinding and discharging efficiency of a plurality of green balls can be improved. Thus, the mass productivity can be improved.

DESCRIPTION OF EMBODIMENTS

Figure 1:
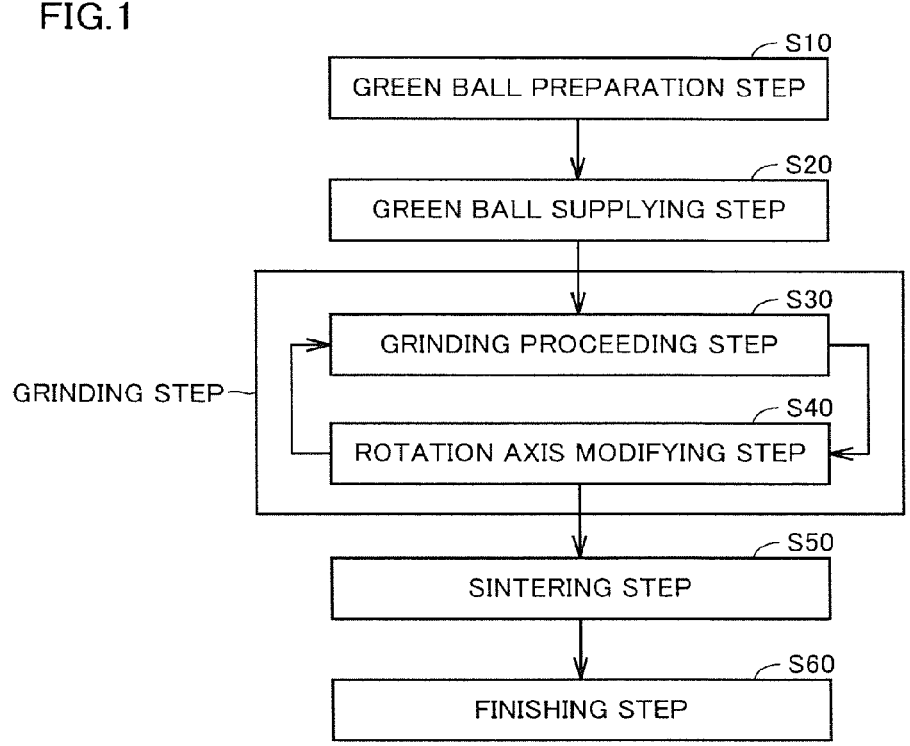
FIG. 1 is a flowchart schematically showing the fabrication process of a ceramic sphere.

Embodiments of the present invention will be described hereinafter based on the drawings. In the drawings, the same or corresponding elements have the same reference characters allotted, and description thereof will not be repeated.

First Embodiment

A first embodiment that is one embodiment of the present invention will be described hereinafter. Referring to FIG. 1, first a green ball preparation step is executed as step S10 in a ceramic sphere fabrication method according to the present embodiment. In step S10, a green ball formed to take the shape of a schematic ceramic sphere is prepared by applying forming techniques such as press forming, casting, extrusion, tumbling granulation to raw material powder of ceramics such as silicon nitride, aluminum oxide, sialon, silicon carbide, and the like.

Then, green ball grinding is performed, including a green ball supplying step executed as step S20, a grinding proceeding step executed as step S30, and a rotation axis modifying step executed as step S40. Thus, the sphericity of the green ball is improved. This green ball grinding will be described afterwards.

Then, a sintering step is executed as step S50. In this step S50, pressure sintering such as HIP (Hot Isostatic Press) or pressureless sintering is applied to the green ball having the sphericity improved by grinding. Thus, a preliminary ball for a ceramic sphere is obtained.

Then, a finishing step is executed as step S60. In this step S60, the preliminary ball obtained by sintering is subjected to a finishing process of grinding. Although the hardness of a preliminary ball is so high that grinding thereof requires a long period of time, the working at the stage of a green ball having low hardness and into high sphericity efficiently, as set forth below, allows grinding of the preliminary ball to be completed in a short period of time. A ceramic sphere of the present embodiment is completed by the aforementioned steps.

Figure 2:
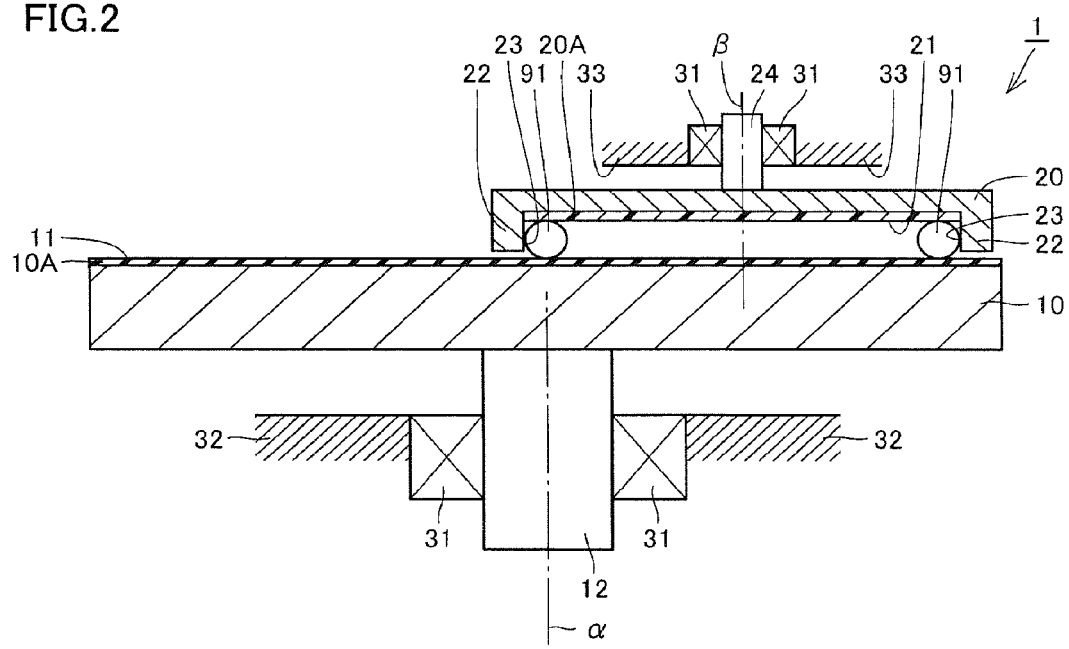
FIG. 2 is a schematic sectional view of a structure of a grinding apparatus.

Details of green ball grinding will be described hereinafter. First, a grinding apparatus used in grinding a green ball will be described. Referring to FIG. 2, a grinding apparatus 1 includes a first plate 10 of a disk shape as a first member having a first surface 11, and a second plate 20 of a disk shape as a second member having a second surface 21 facing first surface 11. In a state where grinding apparatus 1 is set in an operable state, first plate 10 is the lower plate and the second plate is the upper plate in the vertical direction.

First plate 10 is connected to a first shaft 12 protruding towards a side opposite to the side facing the second plate. A bearing 31 is fitted at the outer perimeter face of first shaft 12. Bearing 31 is held by a first holding member 32. By the above-described configuration, first plate 10 is rotatable circumferentially with an axis $\alpha$ matching the center axis of first shaft 12 as the axis of rotation. At the region including first surface 11 of first plate 10 is formed a grinding layer 10A for grinding green ball 91. Grinding layer 10A may be a grindstone, or a netted member such as a wire mesh.

A second shaft 24 protruding in a direction opposite to the side facing the first plate is connected to second plate 20. A bearing 31 is fitted at the outer perimeter side of second shaft 24. Bearing 31 is held by a second holding member 33. By the configuration set forth above, second plate 20 is rotatable circumferentially with an axis $\beta$ matching the center axis of second shaft 24, differing from axis $\alpha$, as the axis of rotation. Axis $\beta$ is parallel to axis $\alpha$. At the region including second surface 21 of second plate 20 is formed a holding layer 20A for holding green ball 91. Holding layer 20A is a resilient member formed of rubber, resin, or the like. Furthermore, a retainer 22 protruding towards the first plate is formed to along the outer perimeter region of second plate 20. Retainer 22 functions to restrict green ball 91 from moving in the radial direction of second plate 20 along second surface 21. Grinding apparatus 1 can grind a green ball 91 while holding the same between first and second surfaces 21 and 11.

Grinding the green ball according to steps S20 to S40 using the above-described grinding apparatus 1 according to the ceramic sphere fabrication method of the present embodiment will be described hereinafter. Referring to FIG. 1, first a green ball supply step is executed as step S20 for green ball grinding of the present embodiment. In step S20, a plurality of green balls prepared at step S10 are supplied between first plate 10 and second plate 20 of grinding apparatus 1, as shown in FIG. 2. At this stage, referring to FIG. 2, first plate 10 rotates with axis cc as the axis of rotation while second plate 20 rotates with axis $\beta$ as the axis of rotation. Accordingly, green ball 91 rotates around its own axis while in orbital motion along an inner wall 23 of retainer 22 of second plate 20.

Then, the grinding step is executed while green ball 91 maintains the state of self-rotation and orbital motion. In this grinding step, a grinding proceeding step executed as step S30 and a rotation axis modifying step executed as step S40 are carried out alternately. In the present embodiment, step S30 and step S40 in the grinding step are carried out alternately with the load on green ball 91 controlled.

Figure 3:
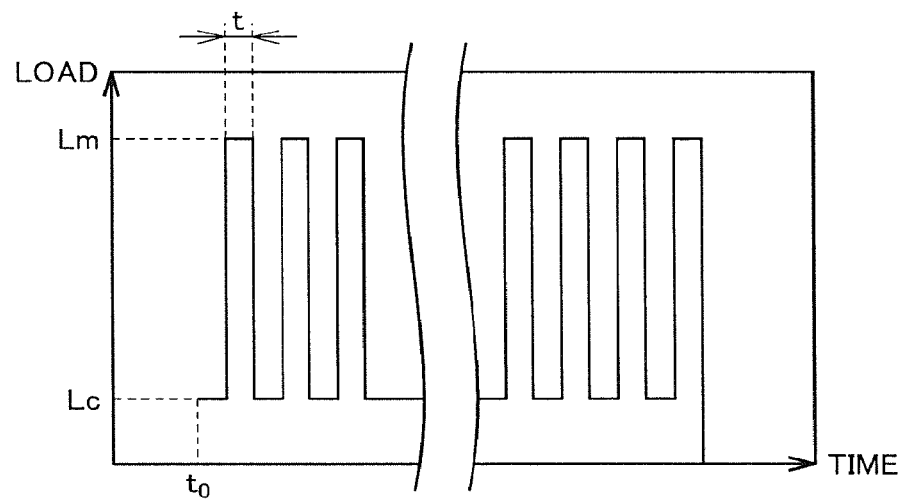
FIG. 3 schematically represents a controlled state of the applied load in a grinding step.

Referring to FIG. 3, time $t_0$ is the point in time when green ball 91 is supplied to a location between first plate 10 and second plate 20 of grinding apparatus 1 in step S20. At this point in time, a load $L_c$ is applied to green ball 91 from first and second plates 10 and 20. This load $L_c$ is substantially 0. At an elapse of a predetermined time, step S30 is executed by a load applied from first and second plates 10 and 20 to green ball 91. Specifically, the surface of green ball 91 is ground by grinding layer 10A by the application of load $L_m$ between first and second surfaces 11 and 21 and green ball 91. Thus, grinding of green ball 91 proceeds. Since green ball 91 is restrained by first and second surfaces 11 and 21, the rotation axis of green ball 91 cannot be moved greatly. Therefore, green ball 91 is worked in a relatively flattened shape having the long axis corresponding to the direction along the plane of revolution, not a true sphere.

At an elapse of a time t from the start of step S30, step S30 ends to proceed to step S40. At step S40, the load applied to green ball 91 from first and second plates 10 and 20 is modified to $L_c$, i.e. substantially 0. As a result, green ball 91 that is rotating in self-rotation and orbital motion erects by the gyroscopic precession such that the long axis corresponds to its rotation axis. In other words, the rotation axis of green ball 91 is modified to the long axis side established in step S30. Thus, the rotation axis of green ball 91 is modified by controlling the load applied by first and second surfaces 11 and 21 on green ball 91.

At the elapse of time t from the start of step S40, step S40 ends and step S30 is carried out again. Since the rotation axis of green ball 91 has been modified to the long axis side at step S40, green ball 91 is worked in the direction of the long axis. As shown in FIG. 3, step S30 and step S40 are repeatedly carried out for every time t.

In the grinding step of the present embodiment, step S40 in which green ball 91 erects such that the long axis corresponds to the rotation axis, and step S30 in which green ball 91 is worked in the direction of the long axis are executed alternately. Accordingly, a higher sphericity can be achieved as compared to the conventional grinding method in which the modification in the direction of rotation axis of green ball 91 is restricted. According to the grinding step in the present embodiment, the sphericity of green ball 91 can be improved sufficiently by realizing isotropic working.

Second Embodiment

A second embodiment that is another embodiment of the present invention will be described hereinafter. The ceramic sphere fabrication method and green ball grinding in this fabrication method of the second embodiment are executed in a manner basically likewise with the first embodiment, and provides similar advantages. The ceramic sphere fabrication method and green ball grinding in this fabrication method of the second embodiment differs from the first embodiment in the control of modifying the rotation axis in the grinding process.

Specifically, in the grinding step of the second embodiment, step S30 and step S40 in the grinding step are executed alternately while the distance between first surface 11 of first plate 10 and second surface 21 of second plate 20 is controlled.

Figure 4:
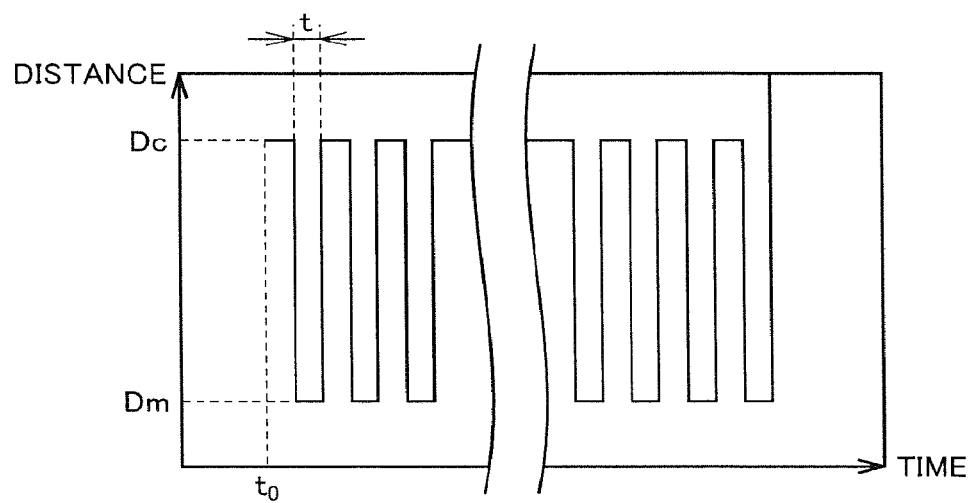
FIG. 4 schematically represents a controlled state of the plate distance in a grinding step.

Specifically, at time $t_0$ in FIG. 4 that is the point in time when green ball 91 is supplied between first plate 10 and second plate 20 of grinding apparatus 1 at step S20, the distance between first surface 11 and second surface 21 is $D_c$. At this stage, the load applied to green ball 91 by first and second surfaces 11 and 21 is substantially 0. In other words, the state where the distance is $D_c$ corresponds to the case where there is a clearance between green ball 91 and second surface 21, or the state where contact is formed, but not having load applied to a level contributing to the progress of grinding green ball from the standpoint of mass productivity.

An elapse of a predetermined time, step S30 is executed by the distance between first plate 10 and second plate 20 being modified to $D_m$. In other words, the distance between first plate 10 and plate 20 becoming $D_m$ causes load of a level contributing to progress of grinding green ball 91 from the standpoint of mass productivity is applied, whereby the surface of green ball 91 is ground by grinding layer 10A. Thus, grinding of green ball 91 proceeds. At this stage, the rotation axis of green ball 91 cannot be moved greatly since green ball 91 is restrained by first and second surfaces 11 and 21. Therefore, at step S30, green ball 91 is worked in a relatively flattened shape having a long axis in a direction along the plane of revolution, instead of a true sphere.

When the elapsed time from the start of step S30 becomes t, step S30 ends, and step S40 is executed. At this step S40, the distance between first plate 10 and second plate 20 is modified to $D_c$. Accordingly, the load applied to green ball 91 from first plate 10 and second plate 20 is modified to substantially 0. As a result, green ball 91 that is turning in self-rotation and in orbital motion erects by the gyroscopic precession such that the long axis becomes the rotation axis. In other words, the rotation axis of green ball 91 is modified to the long axis side established at step S30. Thus, the rotation axis of green ball 91 is modified by controlling the distance between first and second surfaces 11 and 21 at step S40.

At the elapse of time t from the start of step S40, step S40 ends and step S30 is executed again. Since the rotation axis of green ball 91 has been modified to the long axis side at step S40, green ball 91 is worked in the direction of the long axis. As shown in FIG. 4, step S30 and S40 are executed repeatedly for every time t.

In the grinding step of the present embodiment, step S40 in which green ball 91 erects such that the long axis corresponds to the rotation axis, and step S30 in which green ball 91 is worked in the direction of the long axis are executed alternately, likewise with the first embodiment. Accordingly, a higher sphericity can be achieved as compared to the conventional grinding method in which the modification in the direction of rotation axis of green ball 91 is restricted. According to the grinding step in the present embodiment, the sphericity of green ball 91 can be improved sufficiently by realizing isotropic working.

The grinding process of the first embodiment of controlling the load applied to the green ball and the grinding step of the second embodiment controlling the distance between the plates may be executed in combination.

Third Embodiment

A third embodiment that is a further embodiment of the present invention will be described hereinafter. The ceramic sphere fabrication method and green ball grinding in this fabrication method of the third embodiment are executed in a manner basically likewise with the first embodiment, and provides similar advantages. The ceramic sphere fabrication method and green ball grinding in this fabrication method of the third embodiment differ in the employed grinding apparatus, and the mechanism for modifying the rotation axis in the grinding process step, from those of the first embodiment.

Figure 5:
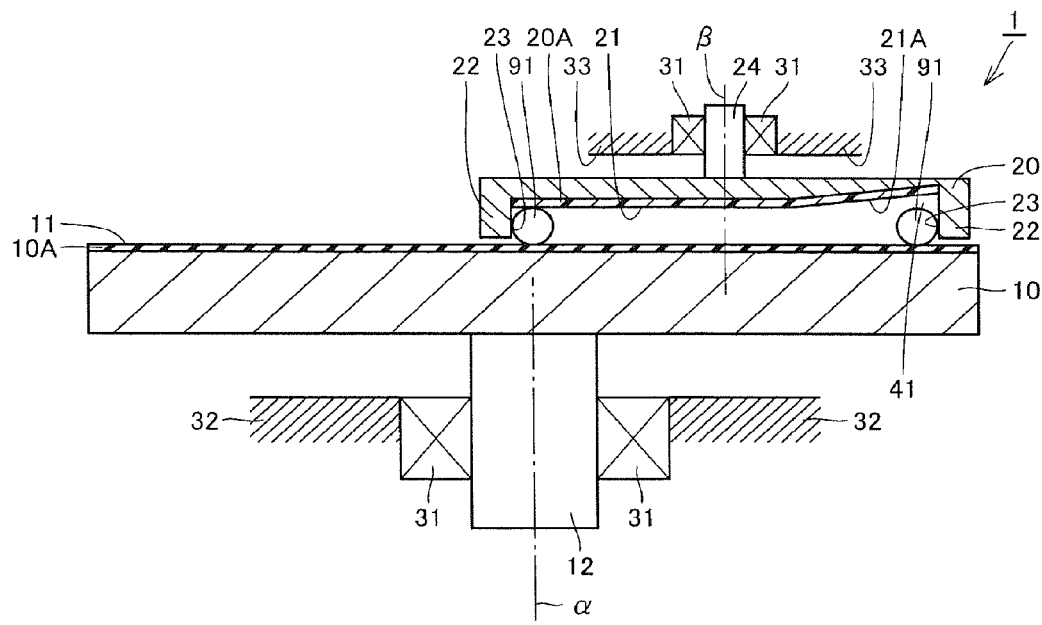
FIG. 5 is a schematic sectional view of another example of a structure of a grinding apparatus.

First, a grinding apparatus according to the present embodiment will be described with reference to FIG. 5. Referring to FIGS. 5 and 2, grinding apparatus 1 of the present embodiment has a structure basically similar to that of the grinding apparatus of the first embodiment, and operates in a similar manner. Grinding apparatus 1 of the third embodiment differs from the first embodiment in the structure of second plate 20.

Referring to FIG. 5, second surface 21 of second plate 20 in grinding apparatus 1 of the third embodiment includes a greater distance region 21A in which the distance from first surface 11 is greater than an adjacent region. Specifically, greater distance region 21A is a slope region formed such that the distance from first surface 11 becomes greater towards the outer side in the radial direction of second surface 21. Greater distance region 21A is formed to occupy a predetermined ratio, for example a ratio of approximately 1/2, in the circumferential direction of second surface 21.

The grinding step using grinding apparatus 1 of the third embodiment will be described hereinafter. When a green ball 91 is supplied between first plate 10 and second plate 20 in grinding apparatus 1, step S30 is executed on any green ball 91 retained between first surface 11 and a region of second surface 21 other than greater distance region 21A. Specifically, the sandwiching between first surface 11 and a region of second surface 21 other than greater distance region 21A causes load of a level contributing to the progress of green ball 91 grinding from the standpoint of mass productivity is applied, whereby the surface of green ball 91 is ground by grinding layer 10A. Thus, grinding of green ball 91 proceeds. At this stage, the rotation axis of green ball 91 cannot be modified greatly since green ball 91 is restrained by first surface 11 and second surface 21. Therefore, green ball 91 is worked in a relatively flattened shape having the long axis corresponding to the direction along the plane of revolution, not a true sphere.

At an elapse of time t from the start of step S30, green ball 91 rolls in orbital motion along an inner wall 23 of retainer 22 of second plate 20, such that green ball 91 moves to a distance changing region 41 formed between greater distance region 21A and first surface 11 facing each other. Thus, step S30 ends, and step S40 is initiated. In this distance changing region 41, the distance between first surface 11 and second surface 21 is greater than that of an adjacent region. At step S40, the load applied to green ball 91 from first and second plates 10 and 20 is modified to substantially 0. As a result, green ball 91 rotating around its own axis and in orbital motion erects by the gyroscopic precession such that the long axis corresponds to its own rotation axis. In other words, the rotation axis of green ball 91 is modified to the long axis side established at step S30. Thus, the rotation axis of green ball 91 is modified by the entry of green ball 91 to distance changing region 41.

At a further elapse of time t from the start of step S40, green ball 91 further rolls in orbital motion along inner wall 23 of retainer 22 of second plate 20 to move out from distance changing region 41. Thus, step S40 ends, and step S30 is executed again. Since the rotation axis of green ball 91 has been modified to the long axis side at step S40, green ball 91 is worked in the direction of the long axis. By the rolling of green ball 91 in orbital motion along inner wall 23 of retainer 22 of second plate 20, step S30 and step S40 are executed repeatedly for every time t.

In the grinding step of the present embodiment, step S40 in which green ball 91 erects such that the long axis corresponds to the rotation axis, and step S30 in which green ball 91 is worked in the direction of the long axis are executed alternately, likewise with the first embodiment. Accordingly, higher sphericity can be achieved as compared to the conventional grinding method in which the modification in the direction of rotation axis of green ball 91 is restricted. According to the grinding step in the present embodiment, the sphericity of green ball 91 can be improved sufficiently by realizing isotropic working.

Fourth Embodiment

Figure 6:
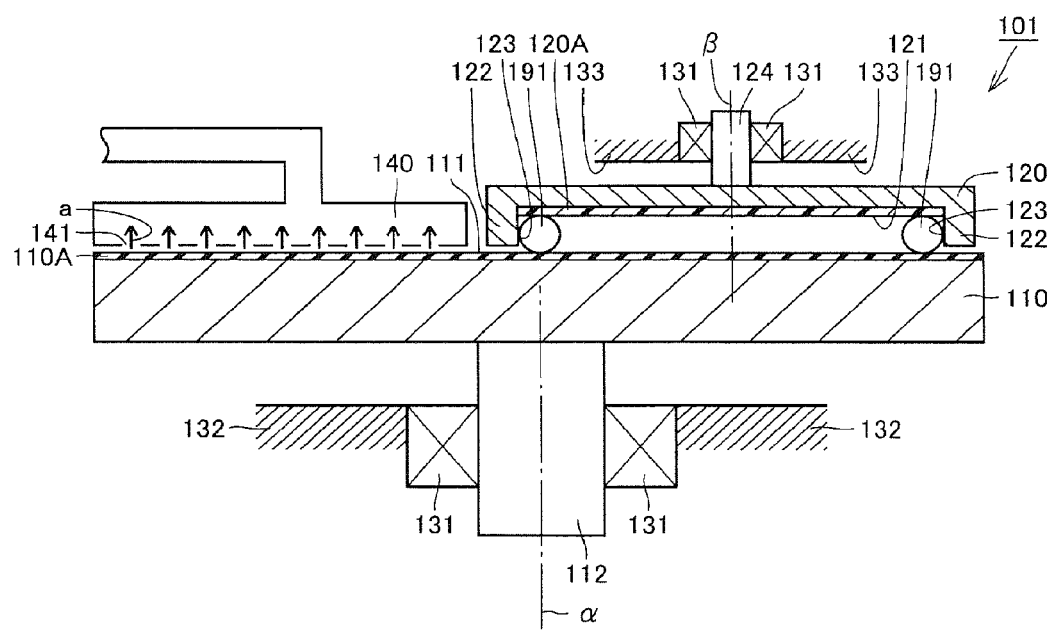
FIG. 6 is a schematic sectional view of a structure of a grinding apparatus.
Figure 7:
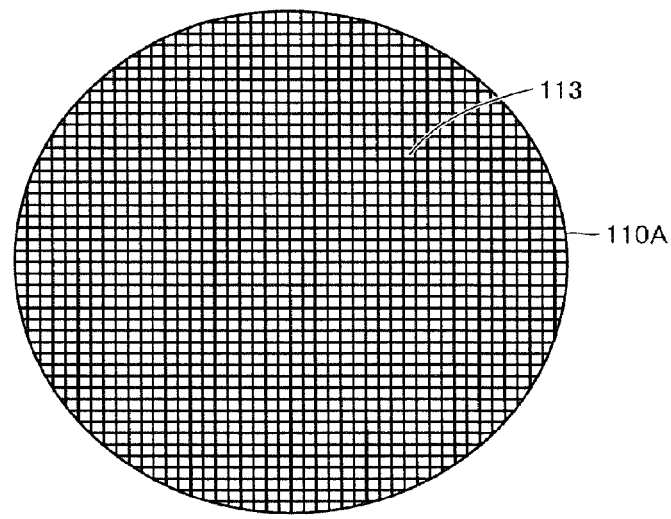
FIG. 7 is a schematic plan view of a structure of a lattice member.

A green ball grinding apparatus according to a fourth embodiment that is another embodiment of the present invention will be described hereinafter. Referring to FIG. 6, a grinding apparatus 101 that is a green ball grinding apparatus according to the fourth embodiment includes a first plate 110 as a first member having a first surface 111 holding green ball 191 by forming contact with green ball 191, a second plate 120 having a second surface 121 facing first surface 111, and holding green ball 191 by forming contact with green ball 191, and also a retainer 122 restricting movement of green ball 191 in a direction along second surface 121 by protruding in a direction crossing second surface 121. When grinding apparatus 101 is installed in an operable state, first plate 110 is the lower plate and second plate 120 is the upper plate in the vertical direction.

First plate 110 is connected to a first shaft 112 protruding towards a side opposite to the side facing second plate 120. A bearing 131 is fitted at the outer perimeter face of first shaft 112. Bearing 131 is held by a first holding member 132. By the above-described configuration, first plate 110 is rotatable circumferentially with an axis $\alpha$ matching the center axis of first shaft 112 as the axis of rotation. At the region including first surface 111 of first plate 110 is formed a grinding layer 110A for grinding green ball 191. Grinding layer 110A may be a grindstone, or a lattice member such as a wire mesh having a lattice shape of a mesh 113 that allows passage of ground particles.

A second shaft 124 protruding in a direction opposite to the side facing first plate 110 is connected to second plate 120. A bearing 31 is fitted at the outer perimeter side of second shaft 124. Bearing 131 is held by a second holding member 133. By the configuration set forth above, second plate 120 is rotatable circumferentially with an axis $\beta$ matching the center axis of second shaft 124, differing from axis $\alpha$, as the axis of rotation. Axis $\beta$ is parallel to axis $\alpha$. At the region including second surface 121 of second plate 120 is formed a holding layer 120A for holding green ball 191. Holding layer 120A is a resilient member formed of rubber, resin, or the like. Furthermore, a retainer 122 protruding towards the first plate is formed along the outer perimeter region of second plate 120. Grinding apparatus 101 can grind a green ball 191 while holding the same between first and second surfaces 121 and 111.

Grinding apparatus 101 according to the present embodiment includes a suction member 140 as a ground particle removal mechanism removing ground particles generated by grinding of green ball 191 from first surface 111 that is the grinding face. Suction member 140 is arranged above first surface 111 of first plate 110 to avoid interference with second plate 120. At a region of suction member 140 facing first surface 111, a plurality of suction holes 141 to draw in ground particles are formed. By the interior of suction member 140 being reduced in pressure than the pressure outside, ground particles are drawn into suction member 140 along arrow a to remove the ground particles from first surface 111 that is the grinding face.

A grinding method of green ball 191 using grinding apparatus 101 will be described hereinafter. Referring to FIG. 6, a plurality of green balls formed by having raw material powder molded in a ball are supplied between first plate 110 and second plate 120 of grinding apparatus 101. At this stage, first plate 110 rotates with axis $\alpha$ as the axis of rotation, and second plate 120 rotates with axis $\beta$ as the axis of rotation, as shown in FIG. 6. In other words, at first plate 110 and second plate 120, relative displacement of a plurality of lines is achieved. Thus, green ball 191 rotates on its own axis, and rolls in orbital motion along inner wall 123 of retainer 122 of second plate 120.

In grinding apparatus 101 according to the present embodiment, first surface 111 servers as a grinding face for grinding a green ball by forming contact with green ball 191. Green ball 191 is sandwiched between first surface 111 and second surface 121. First plate 110 and second plate 120 causes green ball 191 to rotate in orbital motion and around its own axis by the relative displacement of a plurality of lines (here, a revolving motion around different axes). Therefore, green ball 191 rotates in self-rotation while modifying its rotation axis. Furthermore, since first surface 111 functions as the grinding face, a protruding area of green ball 191 is worked with priority by the aforementioned self-rotation, and grinding over the entire surface thereof is carried out. As a result, green ball 191 approaches a true sphere efficiently by the grinding through grinding apparatus 101.

Since grinding apparatus 101 of the present embodiment includes a suction member 140 constituting a ground particle removal mechanism, the clogging at first surface 111 that is the grinding face is suppressed to reduce degradation in the grinding efficiency. Therefore, a grinding work of favorable efficiency can be maintained over a long period of time. Thus, grinding apparatus 101 of the present embodiment suppresses reduction in the grinding efficiency, and can execute green ball grinding efficiently.

As the relative displacement of a plurality of lines by the first and second members of the present invention, the fourth embodiment has been described based on a configuration where first plate 110 as the first member and second plate 120 as the second member rotate around different axes. The relative displacement of a plurality of lines is not limited thereto. Specifically, an endless belt having a plane of linear movement, facing second surface 121, may be employed instead of first plate 110 identified as the first member. In this case, the surface of the belt facing second surface 121 can be set as the grinding face.

Fifth Embodiment

Figure 8:
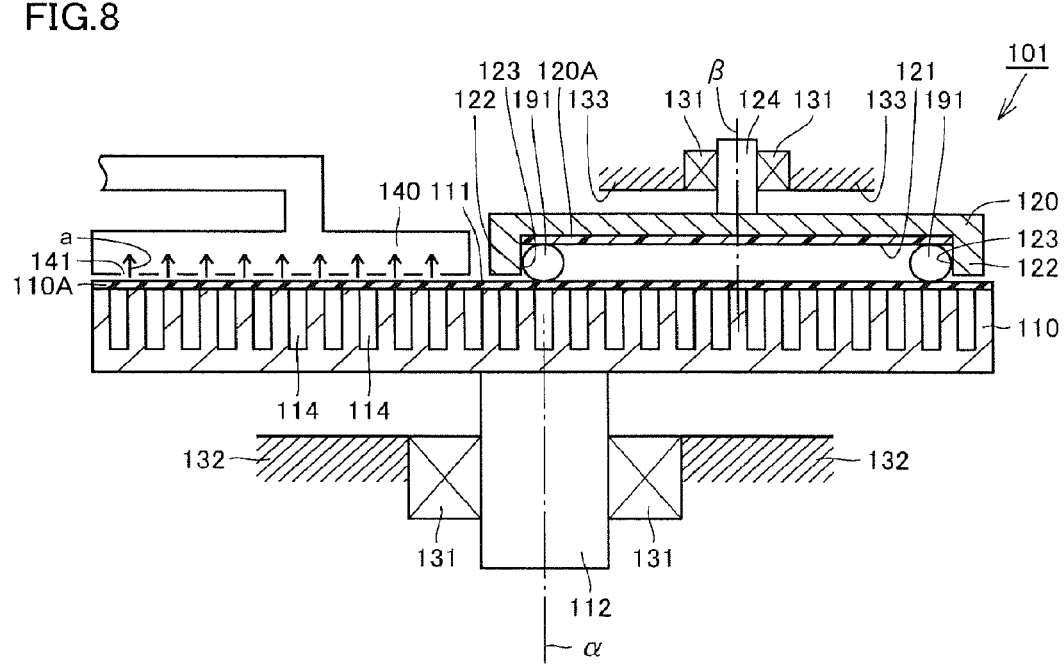
FIG. 8 is a schematic sectional view of another example of a structure of a grinding apparatus.

A fifth embodiment that is still another embodiment of the present invention will be described hereinafter. Referring to FIGS. 8 and 6, grinding apparatus 101 of the fifth embodiment has a structure similar to that grinding apparatus 101 of the fourth embodiment, operates in a similar manner, and provides similar advantages. Grinding apparatus 101 of the fifth embodiment differs from the fourth embodiment in the structure of first plate 110.

Referring to FIG. 8, grinding apparatus 101 of the fifth embodiment has a plurality of holes 114 opening towards grinding layer 110A formed immediately under grinding layer 110A formed of a lattice member of first plate 110 having a first surface 111 that is the grinding face.

By such a configuration, the ground particles passing through the mesh of grinding layer 110A enter holes 114. Therefore, the clogging at the grinding face is further suppressed at grinding apparatus 101 of the present embodiment.

Sixth Embodiment

Figure 9:
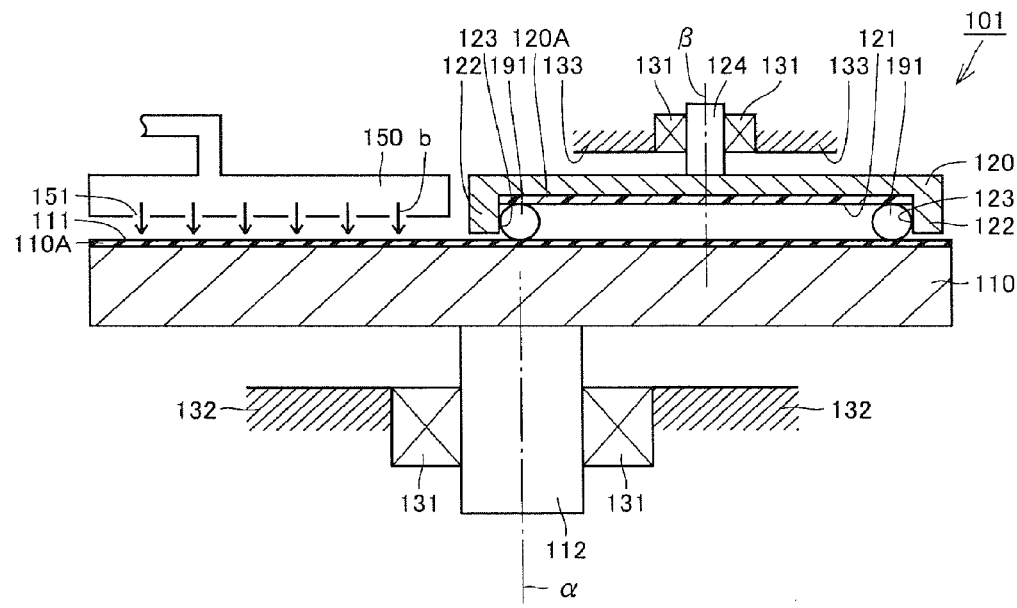
FIG. 9 is a schematic sectional view of a further example of a structure of a grinding apparatus.
Figure 10:
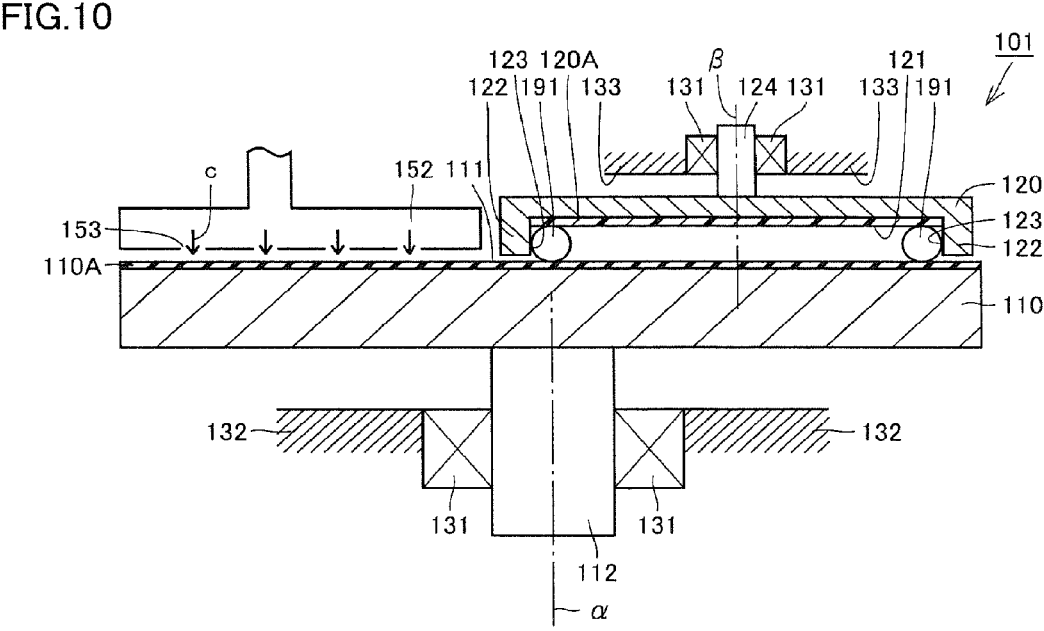
FIG. 10 is a schematic sectional view of another cross section of the grinding apparatus of FIG. 9.

A sixth embodiment that is still another embodiment of the present invention will be described hereinafter. Referring to FIGS. 9, 10 and 6, grinding apparatus 101 that is a green ball grinding apparatus of the sixth embodiment has a structure basically similar to that of grinding apparatus 101 of the fourth embodiment, operates in a similar manner, and provides similar advantages. Grinding apparatus 101 of the sixth embodiment differs from the fourth embodiment in the structure of the ground particle removal mechanism.

Referring to FIGS. 9 and 10, grinding apparatus 101 of the sixth embodiment includes a cleaning member 150 and a drying member 152 constituting a ground particle removal mechanism, instead of suction member 140 set forth in the fourth embodiment. Cleaning member 150 functions to clean first surface 111 by supplying a cleaning solution to first surface 111 that is the grinding face. Specifically, referring to FIG. 9, cleaning member 150 is arranged above first surface 111 to avoid interference with second plate 120. At the region of cleaning member 150 facing first surface 111, a plurality of discharge holes 151 for discharging the cleaning solution are formed. By the cleaning solution being discharged towards first surface 111 that is the grinding face from discharge holes 151 of cleaning member 150, as shown by arrow b, ground particles are removed from first surface 111. For the cleaning solution, water, for example can be employed, having a corrosion inhibitor, a surfactant, or the like added, as necessary.

Drying member 152 functions to dry first surface 111 that is the cleaned grinding face. Specifically, referring to FIG. 10, drying member 152 is arranged above first surface 111 to avoid interference with second plate 120. At this stage, drying member 152 is arranged at the rear side in the rotating direction of first plate 110 in a position viewed from cleaning member 150. At the region of drying member 152 facing first surface 111, a spray hole 153 for spraying out gas is formed. By gas such as dry air being sprayed out from hole 153 of drying member 152 towards first surface 111, first surface 111 can be dried.

By removing the ground particles from the grinding face more reliably using a cleaning solution discharged from cleaning member 150 and drying the grinding face subjected to removal of ground particles by means of drying member 152 in grinding apparatus 101 of the present embodiment, the adverse effect of the remaining cleaning solution on the grinding of green ball 191 can be prevented.

Seventh Embodiment

Figure 11:
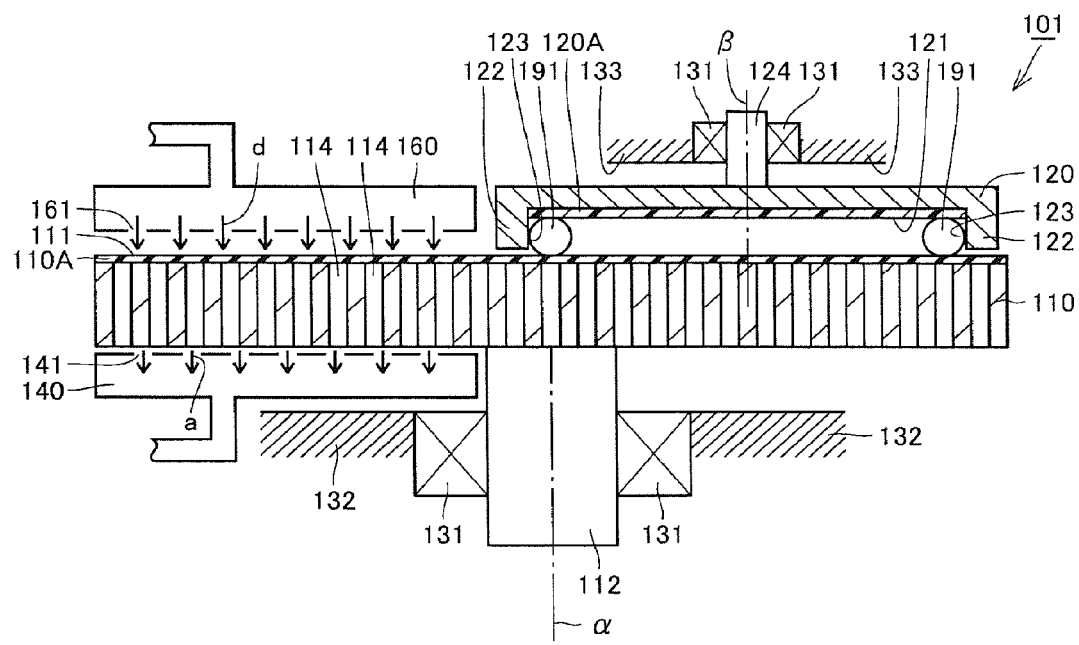
FIG. 11 is a schematic sectional view showing a further example of a structure of a grinding apparatus.

A seventh embodiment that is still another embodiment of the present invention will be described hereinafter. Referring to FIGS. 11 and 8, grinding apparatus 101 of the seventh embodiment has a structure similar to grinding apparatus 101 of the fifth embodiment, operates in a similar manner, and provides similar advantages. Grinding apparatus 101 of the seventh embodiment differs from the fifth embodiment in the structure of first plate 110 and the ground particle removal mechanism.

Referring to FIG. 11, a plurality of holes 114 at first plate 110 in grinding apparatus 101 of the seventh embodiment are formed to penetrate first plate 110 including first surface 111 that is the grinding face in a direction crossing first surface 111 (thickness direction). Suction member 140 and gas spraying member 160 constituting a ground particle removal mechanism are arranged to sandwich first plate 110 in the penetrating direction of holes 114.

Gas spraying member 160 functions to remove ground particles by spraying gas to first surface 111 that is the grinding face. Specifically, gas spraying member 160 is arranged above first surface 111 to avoid interference with second plate 120. At the region of gas spraying member 160 facing first surface 111, a plurality of gas spray holes 161 to spray out gas such as air are formed.

At a position facing the side opposite to the first surface of first plate 110 that faces gas spraying member 160, i.e. at the position facing the opening of holes 114 at the side opposite to the side facing grinding layer 110A, a suction member 140 of a configuration similar to that of the fourth embodiment, having suction holes 141 formed to face the opening of holes 114, is arranged.

By spraying out gas from gas spray holes 161 of gas spraying member 160 towards first surface 111 as indicated by arrow d, ground particles are removed from first surface 111. At this stage, some of the ground particles are scattered away directly from first surface 111 that is the grinding face. The remaining ground particles enter hole 114 through the mesh of grinding layer 110A. The ground particles entering hole 114 are drawn by suction member 140 from the opening of hole 114 at the side opposite to the side facing first surface 111, as indicated by arrow a to be removed. Thus, in grinding apparatus 101 of the present embodiment, the clogging at the grinding face can be suppressed more reliably.

Hole 114 formed at first plate 110, suction member 140 constituting a ground particle removal mechanism, cleaning member 150, drying member 152, and gas spraying member 160 have been described by way of example in the embodiments above. They may be combined appropriately for the purpose of effectively suppressing clogging at the grinding face.

Eighth Embodiment

A configuration of a green ball working apparatus according to an eighth embodiment of the present invention will be described hereinafter.

Figure 12:
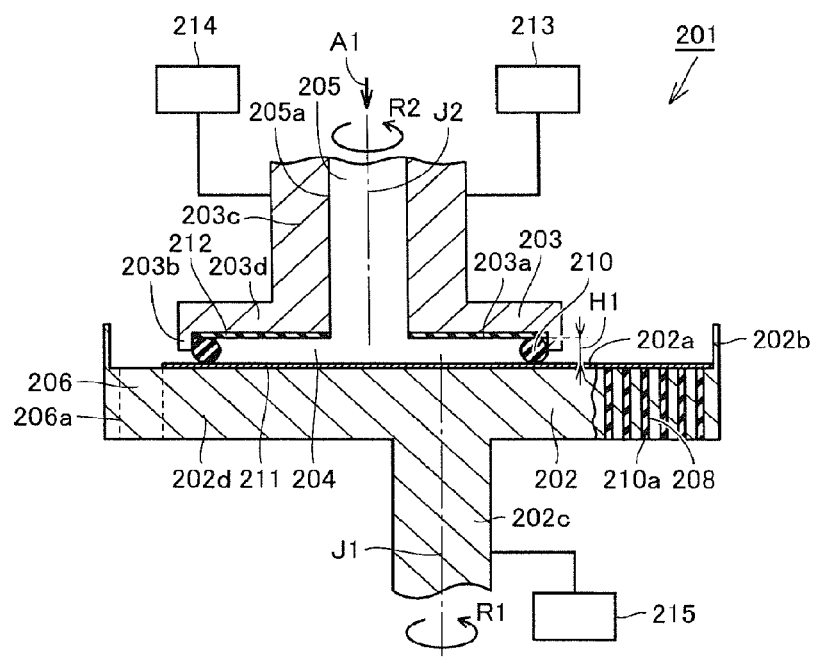
FIG. 12 is a schematic sectional view of a green ball working apparatus according to an eighth embodiment of the present invention with an upper working plate located at a first height position.
Figure 13:
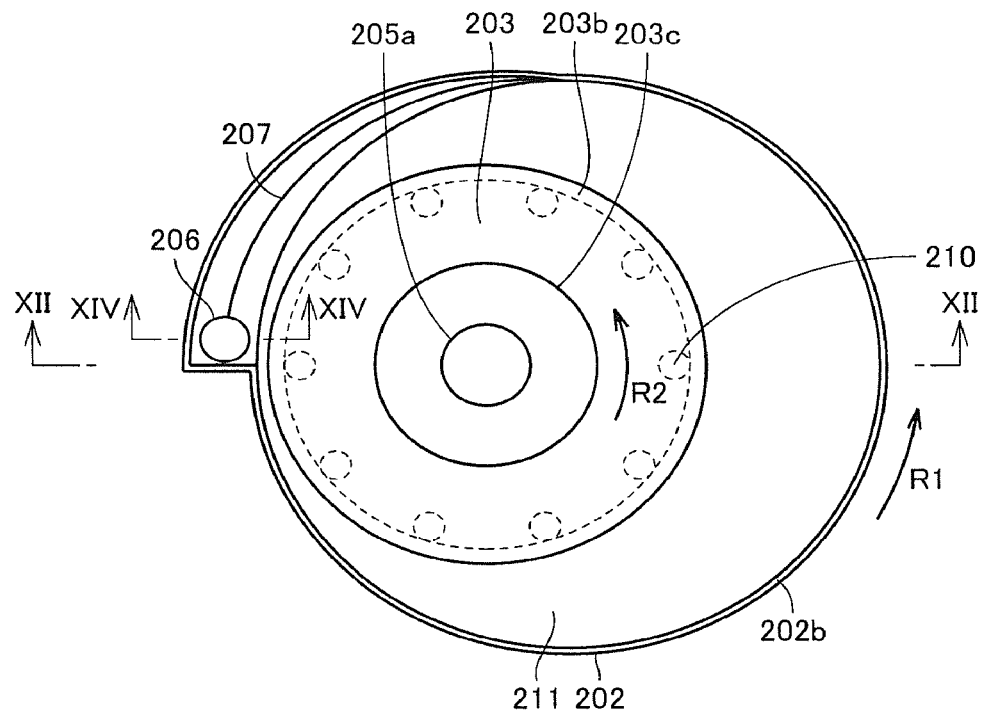
FIG. 13 is a schematic plan view of the green ball working apparatus of FIG. 12.

Referring to FIGS. 12 and 13, a working apparatus 201 of green ball 210 of the present embodiment mainly includes a lower working plate 202, an upper working plate 203, a first rotation drive device 213, a lift device 214, and a second rotation drive device 215. FIG. 12 is a schematic sectional view taken along line XII-XII of FIG. 13.

Working apparatus 201 of green ball 210 is directed to working a plurality of green balls 210. Lower working plate 202 and upper working plate 203 are directed to sandwiching a plurality of green balls 210 for grinding in an interior space 204 defined between a first plane 202a of lower working plate 202 and a second plane 203a of upper working plate 203 with upper working plate 203 in a state located at a first height position H1. This first height position H1 corresponds to a height level relative to lower working plate 202 that allows green balls 210 to be sandwiched between upper working plate 203 and lower working plate 202 for grinding work.

First rotation drive device 213 functions to drive upper working plate 203 rotatably around a rotation center J2. Lift device 214 functions to move upper working plate 203 up and down relative to lower working plate 202. Second rotation drive device 215 functions to drive lower working plate 202 rotatably about a rotation center J1.

Upper working plate 203 is arranged above lower working plate 202. Upper working plate 203 includes a rotary shaft 203c, and an upper flange 203d provided to expand at the outer circumferential side of rotary shaft 203c at the lower working plate 202 side of rotary shaft 203c. Upper working plate 203 includes an insertion section 205 for introducing green ball 210 into interior space 204 at first height position H1, as indicated by arrow A1 in FIG. 12. Insertion section 205 includes an insertion through hole 205a provided at upper working plate 203 to allow green ball 210 prior to grinding to pass through upper working plate 203. Insertion through hole 205a in rotary shaft 203c reaches interior space 204 along the axial direction of rotary shaft 203c at the center in the radial direction thereof. Insertion through hole 205a corresponds to a circle having a diameter greater than two times the diameter of green ball 210.

Upper working plate 203 includes a second plane 203a facing first plane 202a of lower working plate 202, along a portion of rotary shaft 203c and a portion of upper flange 203d at the face towards lower working plate 202. Second plane 203a is not provided at the region where insertion section 205 is formed. At second plane 203a, a rubber or resin-made resilient plate 212 for pressing green ball 210 is provided. At the outer circumferential edge of second plane 203a of upper working plate 203, an annular upper guide wall 203b protruding downwards is provided. The amount of protrusion of upper guide wall 203b is set such that green ball 210 does not roll over upper guide wall 203b.

Lower working plate 202 includes a lower rotary shaft 202c, and a lower flange 202d provided to extend from lower rotary shaft 202c towards the outer circumferential side at the side relative to upper working plate 203 in lower rotary shaft 202c. Lower working plate 202 is formed larger than upper working plate 203 so as to face the entirety of second plane 203a of upper working plate 203. Lower working plate 202 includes a first plane 202a corresponding to the face of lower rotary shaft 202c and a portion of lower flange 202d at the side relative to upper working plate 203. A rough faced constituent member 211 having meshes such as a wire mesh or fabric is provided at first plane 202a of lower working plate 202. A rough surface for grinding is formed by rough faced constituent member 211.

Lower working plate 202 includes a hole 208 for discharging ground particles 210a generated as a result of grinding green ball 210. Hole 208 is formed to open at first plane 202a. A plurality of holes 208 are formed. Lower working plate 202 has a honeycomb structure by these holes 208. Although holes 208 are formed to penetrate lower working plate 202, they may be formed so as not to penetrate lower working plate 202.

An annular lower guide wall 202b is provided protruding upwards at the outer circumferential edge of first plane 202a and discharge section 206 of lower working plate 202. The amount of protrusion of lower guide wall 202b is set such that green ball 210 does not roll over lower guide wall 202b.

Lower working plate 202 includes a discharge section 206 to discharge green balls 210 located on first plane 202a of lower working plate 202. Discharge section 206 is configured outside the range of interior space 204. Discharge section 206 is provided continuous to first plane 202a, and configured inclining, lower than first plane 202a. Discharge section 206 is arranged at a side outer of first plane 202a. Discharge section 206 includes a discharge through hole 206a provided at lower working plate 202 such that green balls 210 subjected to grinding can pass through lower working plate 202.

Figure 14:
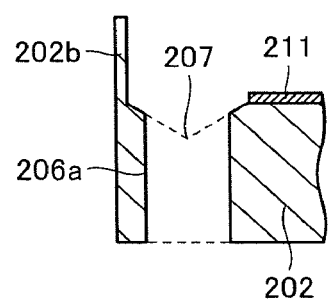
FIG. 14 is a schematic sectional view taken along line XIV-XIV of FIG. 13.

Referring to FIGS. 13 and 14, discharge section 206 includes a valley 207 that is recessed relative to first plane 202a. Valley 207 is configured to have a recessed shape such that the middle in the shorter side direction of discharge section 206 is lower, and is formed along the longitudinal direction. Valley 207 is configured to guide green ball 210 from first plane 202a to discharge through hole 206a.

Figure 15:
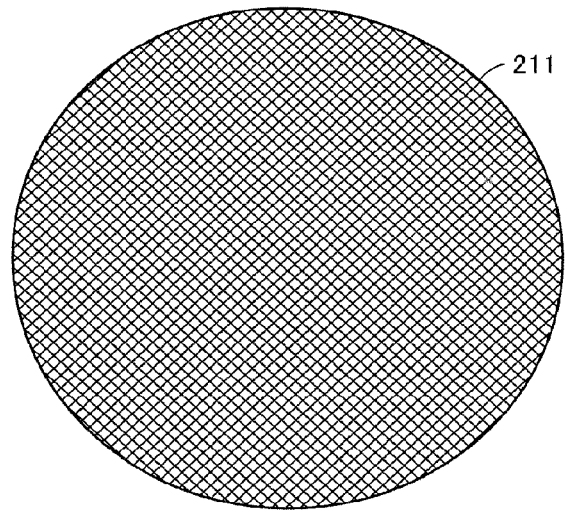
FIG. 15 is a schematic plan view of a rough face for grinding at a lower working plate according to the eighth embodiment of the present invention.

Referring to FIG. 15, in the case where a wire mesh is used for rough faced constituent member 211, a net having a mesh that is less than or equal to 1 mm, for example 60 mesh or 100 mesh, is preferable. In the case of a fabric, a synthetic fabric of Amundsen weave or the like can be used. In contrast to a structure in which ground particles drop down, emery paper (#60-500) may be used as rough faced constituent member 211. Further, lower working plate 202 may be an electrodeposition wheel. Moreover, first plane 202a of lower working plate 202 may be knurled to be used as the rough surface for grinding.

First rotation drive device 213 is connected to upper working plate 203, and configured to rotate upper working plate 203 by the driving force of first rotation drive device 213 rotatably in the direction of arrow R2 in the drawing about rotation center J2. Lift device 214 is connected to upper working plate 203, configured to move upper working plate 203 up and down relative to lower working plate 202 by the driving force of lift device 214. Second rotation drive device 215 is connected to lower working plate 202, and configured to rotate second drive rotation device 215 rotatably in the direction of arrow R1 in the drawing about rotation center J1 by the driving force of second rotation drive device 215.

The direction of rotation by first rotation drive device 213 and second rotation drive device 215 is not particularly limited to that set forth above. The rotation direction by first rotation drive device 213 and second rotation drive device 215 may be identical, or in the opposite direction.

Rotation center J2 of upper working plate 203 and rotation center J1 of lower working plate 202 are configured to be decentered when viewed in the overlapping direction of lower working plate 202 and upper working plate 203.

First rotation drive device 213 does not have to be connected to upper working plate 203. Further, upper working plate 203 may be configured to rotate by the driving force of lower working plate 202 being conveyed via green ball 210. Further, upper working plate 203 may be configured so as not to rotate.

The present invention has been described based on the case where lift device 214 is connected to upper working plate 203. Alternatively, lift device 214 may be connected to lower working plate 202. Furthermore, lift device 214 may be connected to both upper working plate 203 and lower working plate 202.

In other words, upper working plate 203 is to be configured to allow relative rotation with respect to lower working plate 202. Further, upper working plate 203 is to be configured to move up and down relatively between a first height position H1 and a second height position H2 higher than first height position H1, relative to lower working plate 202. This height of second position is the height of upper working plate 203 relative to lower working plate 202, allowing discharge of green ball 210 from the location between upper working plate 203 and lower working plate 202.

Upper working plate 203 and lower working plate 202 are configured to allow green ball 210 to be retained in interior space 204 with upper working plate 203 in a state located at first height position H1 by the downward movement of upper working plate 203 relative to lower working plate 202. Furthermore, upper working plate 203 and lower working plate 202 are configured to allow green ball 210 to be discharged from the space between upper working plate 203 and lower working plate 202 with upper working plate 203 in a state located at second height position 112 by the downward movement of upper working plate 203 relative to lower working plate 202.

A green ball working method according to the present embodiment will be described hereinafter.

Referring to FIGS. 12 and 13, lower working plate 202 is rotated in the direction of arrow R2 in the drawing about rotation center J2 by second rotation drive device 215. By moving upper working plate 203 downward relative to lower working plate 202 through lift device 214 with lower working plate 202 in a state of rotation, upper working plate 203 is arranged at first height position H1. A plurality of green balls 210 are introduced into interior space 204 defined by upper working plate 203 and lower working plate 202 with upper working plate 203 at first height position H1. An insertion through hole 205a communicating with interior space 204 is formed in upper working plate 203. A plurality of green balls 210 are inserted into interior space 204 via insertion through hole 205a.

In interior space 204, a plurality of green balls 210 are retained, sandwiched between upper working plate 203 and lower working plate 202. Green balls 210 are brought into contact with rough faced constituent member 211 of lower working plate 202 and a resilient plate 212 of upper working plate 203.

Under this state, upper working plate 203 is rotated in a direction of arrow R1 in the drawing by first rotation drive device 213. Accordingly, green balls 210 are ground by rotating upper working plate 203 relative to lower working plate 202. Green balls 210 rotate in orbital motion along the inner circumference of upper guide wall 203b in the direction of arrow R2 in FIGS. 12 and 13 while also rotating on its own axis by the frictional force between lower working plate 202 and upper working plate 203 and the centrifugal force. Lower working plate 202 and upper working plate 203 are rotated at a speed that does not impede the orbital motion of green balls 210.

The downward load applied to upper working plate 203 through lift device 214 causes the rough face of rough faced constituent member 211 of lower working plate 202 to serve as a grinding face, whereby each green ball 210 is ground. Since any protruding region is ground in priority at each green ball 210, green ball 210 is worked to approach a true sphere in shape. Ground particles 210a scraped off pass through the mesh of rough faced constituent member 211 formed of wire mesh or fabric to fall downwards from holes 208 provided at lower working plate 202. In the case where hole 208 is not a through hole, ground particles 210a will be accumulated in hole 208.

Figure 16:
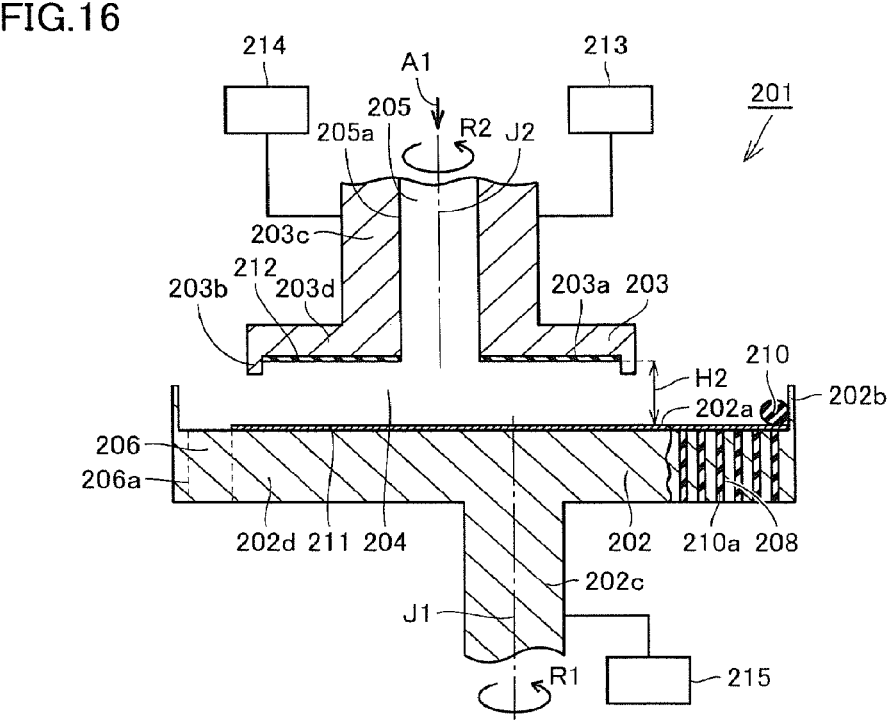
FIG. 16 is a schematic sectional view of the green ball working apparatus according to the eighth embodiment of the present invention showing the transfer of a green ball from the space between the upper and lower working plates with the upper working plate in a state located at a second height position.
Figure 17:
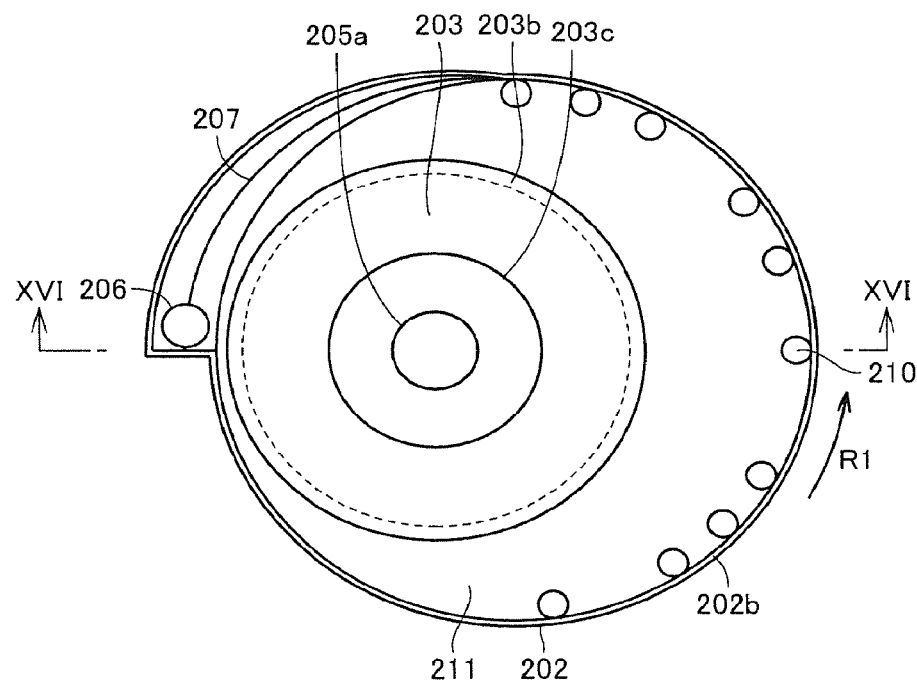
FIG. 17 is a schematic plan view of the green ball working apparatus of FIG. 16.

Referring to FIGS. 16 and 17, when the grinding process of green balls 210 ends, upper working plate 203 is moved upwards by lift device 214 relative to lower working plate 202 to be located at second height position H2. When the distance between upper guide wall 203b of upper working plate 203 and first plane 202a of lower working plate 202 becomes greater than the diameter of green balls 210 by the upward movement of upper working plate 203 relative to lower working plate 202, green balls 210 subjected to grinding move from the gap between upper guide wall 203b and first plane 202a to be discharged to lower working plate 202 from interior space 204 by the frictional force of lower working plate 202 and the centrifugal force. Upper working plate 203 in a state located at second height position H2 may rotate or not rotate.

Figure 18:
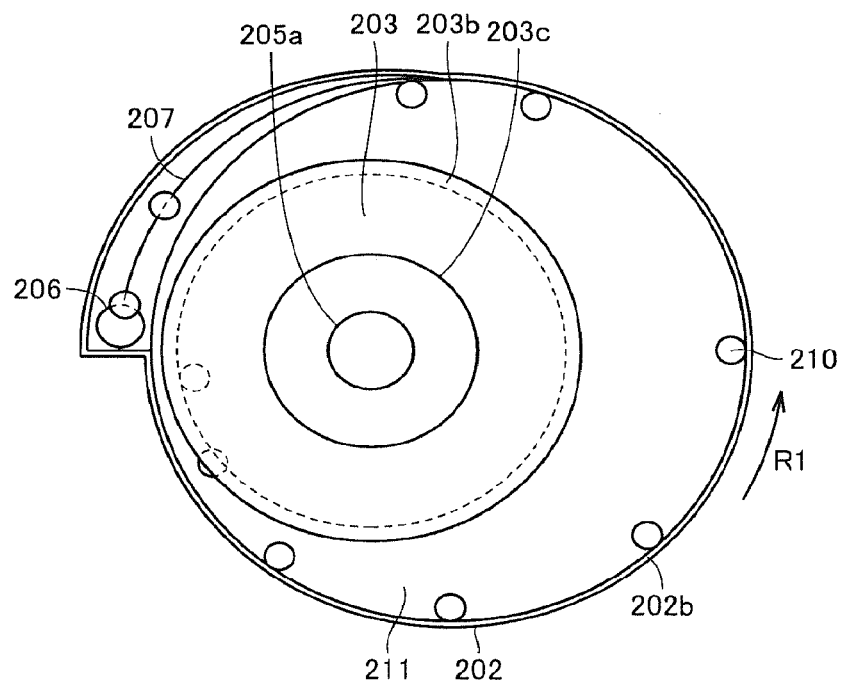
FIG. 18 is a schematic plan view of the green ball working apparatus according to the eighth embodiment of the present invention, showing an exemplified trajectory of green balls moving from the lower working plate to the discharge section.

Referring to FIG. 18, the manner of green balls 210 subjected to grinding being discharged from interior space 204 towards discharge section 206 via lower working plate 202 will be described hereinafter.

Green ball 210 discharged from the space between upper working plate 203 and lower working plate 202 moves by the frictional force of lower working plate 202 in the direction of arrow R1 according to the rotation of lower working plate 202 to move towards lower guide wall 202b by the centrifugal force. When green ball 210 moves as far as to lower guide wall 202b, green ball 210 rolls along the inner circumference of lower guide wall 202b in orbital motion in the direction of arrow R1 in FIG. 18 while rotating about its own axis through the frictional force of lower working plate 202 and the centrifugal force. Since lower guide wall 202b is provided continuous to first plane 202a and the outer circumference of discharge section 206, green ball 210 moves along the inner circumference of lower guide wall 202b from first plane 202a to discharge section 206. Discharge section 206 includes a discharge through hole 206a that is a through hole formed outside the range of interior space 204. Green ball 210 shifted to discharge section 206 is guided by valley 207 to move to discharge through hole 206a. Green balls 210 subjected to grinding are discharged from lower working plate 202 through discharge through holes 206a.

Figure 19:
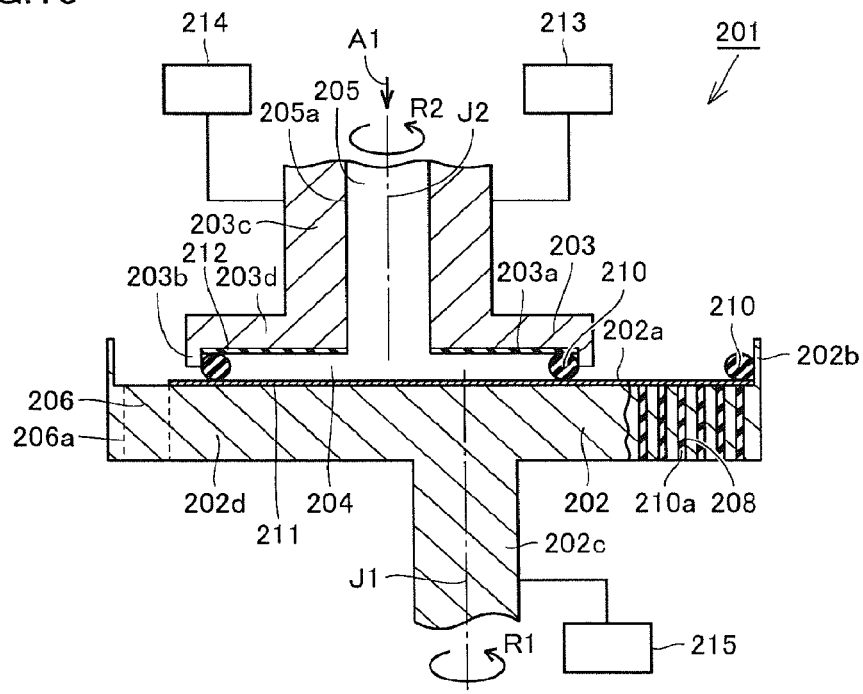
FIG. 19 is a schematic sectional view of the green working apparatus according to the eighth embodiment of the present invention, showing a transfer of green balls from the lower working plate to the discharge section with the upper working plate in a state located at the first height position.
Figure 20:
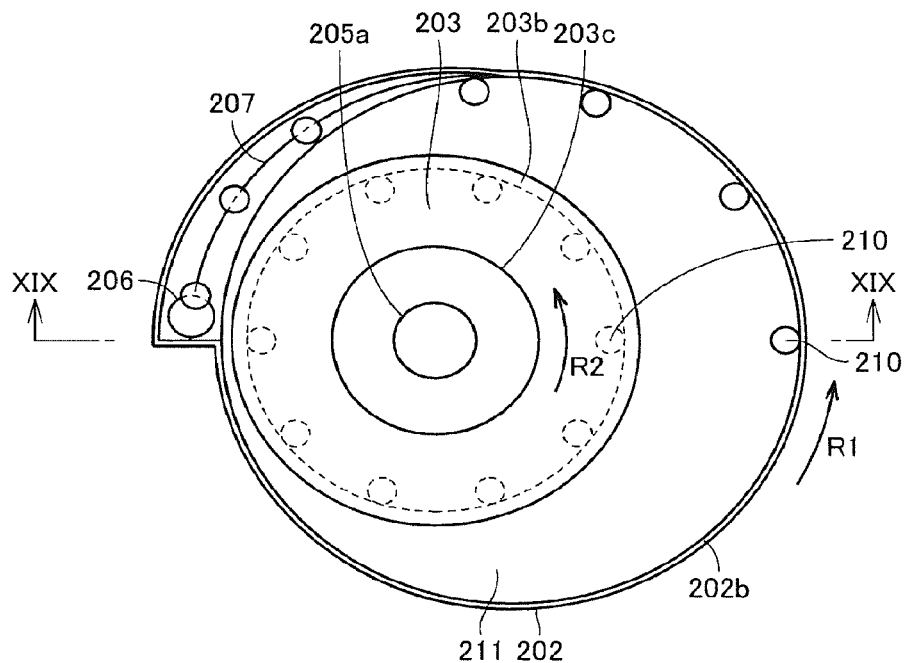
FIG. 20 is a schematic plan view of the green ball working apparatus of FIG. 19.

Referring to FIGS. 19 and 20, following the state where green balls 210 subjected to grinding are discharged to lower working plate 202 from interior space 204, green balls 210 subjected to grinding are guided towards discharge section 206. By moving upper working plate 203 downwards relative to lower working plate 202 with green balls 210 subjected to grinding in a state moving on lower working plate 202, upper working plate 203 attains first height position H1. Under this state, a new set of green balls 210 are inserted into interior space 204 from insertion through hole 205a, such that the new set of green balls 210 are sandwiched at interior space 204. Upper working plate 203 is rotated relative to lower working plate 202 with the new set of green balls 210 sandwiched in interior space 204 to cause grinding of the new set of green balls 210.

Although the present invention has been described based on a configuration in which both lower working plate 202 and upper working plate 203 rotate, at least lower working plate 202 should rotate.

Green ball 210 is sintered after grinding, and further ground after sintering, as necessary, to be a ceramic sphere for a bearing or the like.

The functional effect of the present embodiment will be described hereinafter.

Green ball working apparatus 201 of the present embodiment is configured such that green balls 210 can be retained in interior space 204 with upper working plate 203 in a state located at first height position H1, and green balls 210 can be discharged from the space between upper working plate 203 and lower working plate 202 with upper working plate 203 in a state located at second height position H2, by means of upper working plate 203 and lower working plate 202. Thus, green balls 210 subjected to grinding are discharged from the space between upper working plate 203 and lower working plate 202 by the movement of the upper working plate to second height position H2, while a new set of green balls 210 can be ground in interior space 204 by the movement of upper working plate 203 to first height position H1. Thus, the discharge of green balls 210 subjected to grinding from the space between upper working plate 203 and lower working plate 202 and the grinding of a new set of green balls 210 in interior space 204 can be carried out at the same time. Since a plurality of green balls 210 can be ground continuously thereby, the amount of green balls 210 subjected to grinding can be increased. Therefore, the mass productivity can be improved.

Since discharge section 206 is formed outside the range of interior space 204, a new set of green balls 210 can be ground in interior space 204 while green balls subjected to grinding are discharged from discharge section 206. Furthermore, since lower working plate 202 includes discharge section 206 to discharge green balls 210 away from first plane 202a of lower working plate 202, green balls 210 subjected to grinding can be automatically discharged from lower working plate 202. Therefore, lower working plate 202 does not have to be stopped in order to remove green balls 210 subjected to grinding from lower working plate 202. Since a plurality of green balls 210 can be ground continuously thereby, the amount of green balls 210 subjected to grinding can be increased. Therefore, the mass productivity can be improved.

Furthermore, green balls 210 are inserted from insertion section 205 to interior space 204 with upper working plate 203 in a state located at first height position H1, and green balls 210 are retained in interior space 204. Since a plurality of green balls 210 are inserted under a state where interior space 204 is formed, a plurality of green balls 210 can be sandwiched rapidly in interior space 204. Therefore, the time required for sandwiching green balls 210 in interior space 204 can be shortened. Thus, the mass productivity can be improved.

According to green ball working apparatus 201 of the present embodiment, insertion section 205 includes an insertion through hole 205a provided at upper working plate 203 such that green balls 210 prior to grinding can pass through upper working plate 203. Since insertion through hole 205a is a through hole, green ball 210 can be inserted rapidly into interior space 204. Therefore, the mass productivity can he improved.

According to working apparatus 201 of green ball 210 of the present embodiment, insertion through hole 205a is formed in rotary shaft 203c of upper working plate 203. Green ball 210 introduced in interior space 204 moves from the location between insertion through hole 205a formed in rotary shaft 203c and first plane 202a by the centrifugal force to the inner circumference of upper guide wall 203b. Therefore, green balls 210 will not be retained at the location between insertion through hole 205a formed in rotary shaft 203c and first plane 202a. Therefore, since insertion through hole 205a is formed at a location where green balls 210 are not retained, insertion through hole 205a will not impede the grinding process. Therefore, the grinding efficiency by insertion through hole 205a is not degraded. Thus, the mass productivity can be improved.

According to working apparatus 201 of green ball 210 of the present embodiment, insertion through hole 205a takes a circular shape having a diameter two times greater than the diameter of green ball 210. Therefore, even if two green balls 210 are inserted simultaneously into insertion through hole 205a, green balls 210 will not be jammed in insertion through hole 205a. Therefore the time required to insert green balls 210 into interior space 204 can be shortened. Thus, the mass productivity can be improved.

According to working apparatus 201 of green ball 210 of the present embodiment, discharge section 206 includes a discharge through hole 206a provided at lower working plate 202 such that green ball 210 subjected to grinding can pass through lower working plate 202. Discharge through hole 206a allows green ball 210 to be discharged quickly from discharge section 206 by virtue of being a through hole. Thus, the mass productivity can be improved.

According to working apparatus 201 of green ball 210, discharge section 206 includes a valley 207 that is recessed relative to first plane 202a. Valley 207 is configured to guide green ball 210 to discharge through hole 206a. Since a plurality of green balls 210 are guided in series to discharge through hole 206a by valley 207, the jamming of green balls 210 at discharge section 206 is prevented. Therefore, the discharge efficiency of green balls 210 can be improved. Thus, the mass productivity can be improved.

Since both upper working plate 203 and lower working plate 202 are configured to rotate in working apparatus 201 of green balls 210 of the present embodiment, the grinding process of green balls 210 and the discharge of green balls 210 subjected to grinding from the space between upper working plate 203 and lower working plate 202 can be carried out independently. Therefore, the grinding process and discharge efficiency of a plurality of green balls 210 can be improved. Thus, the mass productivity can be improved.

According to working apparatus 201 of green balls 210 of the present embodiment, upper working plate 203 and lower working plate 202 are configured such that the rotation center J2 of upper working plate 203 and rotation center J1 of lower working plate 202 are decentered. Therefore, green balls 210 sandwiched between upper working plate 203 and lower working plate 202 can rotate on its own axis in various directions. Therefore, green balls 210 can be ground in a short period of time. Thus, the mass productivity can be improved.

According to working apparatus 201 of green balls 210 of the present embodiment, lower working plate 202 includes a hole 208 to discharge ground particles 210a generated as a result of green ball 210 being ground from interior space 204. Therefore, the clogging of ground particles 210a in interior space 204 can be prevented. Accordingly, the efficiency of green balls 210 subjected to grinding can be improved. Thus, the mass productivity can be improved.

According to a working method of green ball 210 of the present embodiment, following the state where green balls 210 subjected to grinding are discharged to lower working plate 202 from interior space 204, a new set of green balls 210 are sandwiched in interior space 204 to be subjected to grinding while previous green balls 210 subjected to grinding are guided to discharge section 206. Therefore, a new set of green balls 210 can be ground at interior space 204 while green balls 210 subjected to grinding are guided towards discharge section 206. Since a plurality of green balls 210 can be ground continuously, the amount of green balls 210 subjected to grinding can be increased. Thus, the mass productivity can be improved.

According to the working method of green ball 210 of the present embodiment, a plurality of green balls 210 are inserted into interior space 204 through a through hole (insertion through hole 205a). Therefore, green balls 210 can be inserted quickly into interior space 204 through a through hole (insertion through hole 205a). Furthermore, since a plurality of green balls 210 are inserted into interior space 204, the work required to sandwich a plurality of green balls 210 in interior space 204 can be shortened. Thus, the mass productivity can be improved.

Discharge section 206 includes a discharge hole (discharge through hole 206a) formed outside the range of interior space 204, and a plurality of green balls 210 subjected to grinding are discharged through the discharge hole (discharge through hole 206a) from lower working plate 202. Therefore, a new set of green balls 210 can be ground at interior space 204 while green balls 210 subjected to grinding are discharged from discharge section 206. Since a plurality of green balls 210 can be ground continuously, the amount of green balls 210 subjected to grinding can be increased. Thus, the mass productivity can be improved.

Furthermore, green balls 210 subjected to grinding can be discharged automatically from lower working plate 202. Therefore, lower working plate 202 does not have to be stopped in order to remove green balls 210 subjected to grinding from lower working plate 202. Since a plurality of green balls 210 can be ground continuously, the amount of green balls subjected to grinding can be increased. Thus, the mass productivity can be improved.

According to the working method of green ball 210 of the present embodiment, green balls 210 subjected to grinding are discharged from interior space 204 by moving upper working plate 203 upwards relative to lower working plate 202, and a new set of green balls can be sandwiched in interior space 204 by moving upper working plate 203 downwards relative to lower working plate 202.

By moving upper working plate 203 upwards and downwards relative to lower working plate 202, a plurality of green balls 210 subjected to grinding can be discharged from interior space 204, and a new set of green balls can be sandwiched in interior space 204. Therefore, the discharging and sandwiching of green balls 210 from and into interior space 204 can be carried out rapidly. Thus, the mass productivity can be improved.

According to the working method of green ball 210 of the present embodiment, the grinding of green balls 210 and the discharge of green balls 210 subjected to grinding from the space between upper working plate 203 and lower working plate 202 can be carried out independently since both upper working plate 203 and lower working plate 202 rotate. Therefore, the grinding process and discharge efficiency of green balls 210 can be improved. Thus, the mass productivity can be improved.

Ninth Embodiment

A green ball working apparatus according to a ninth embodiment of the present invention mainly differs from that of the eighth embodiment in the configuration of insertion through hole 205a.

Figure 21:
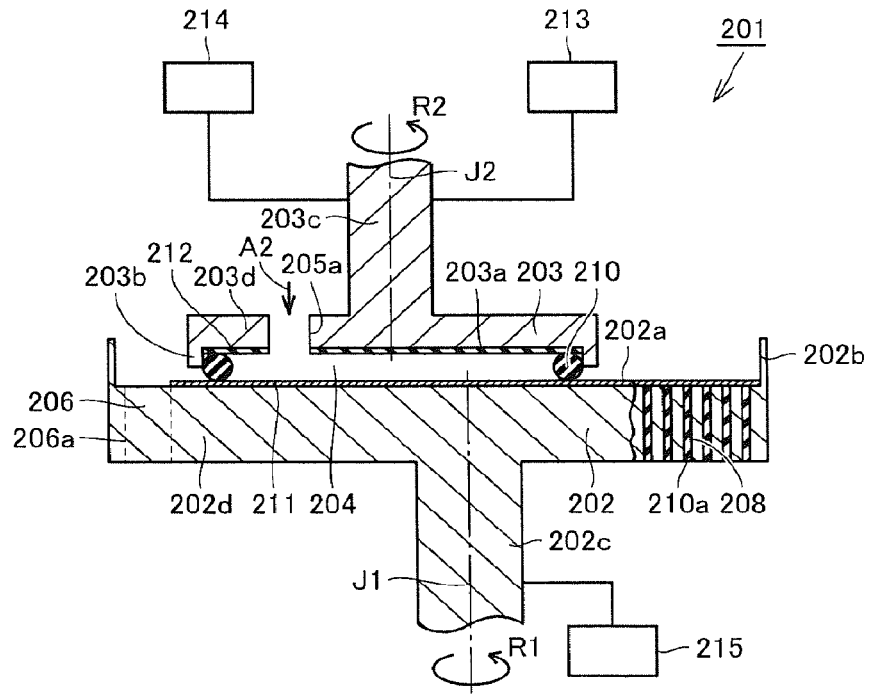
FIG. 21 is a schematic sectional view of the green ball working apparatus according to the ninth embodiment of the present invention with the upper working plate in a state located at the first height position.
Figure 22:
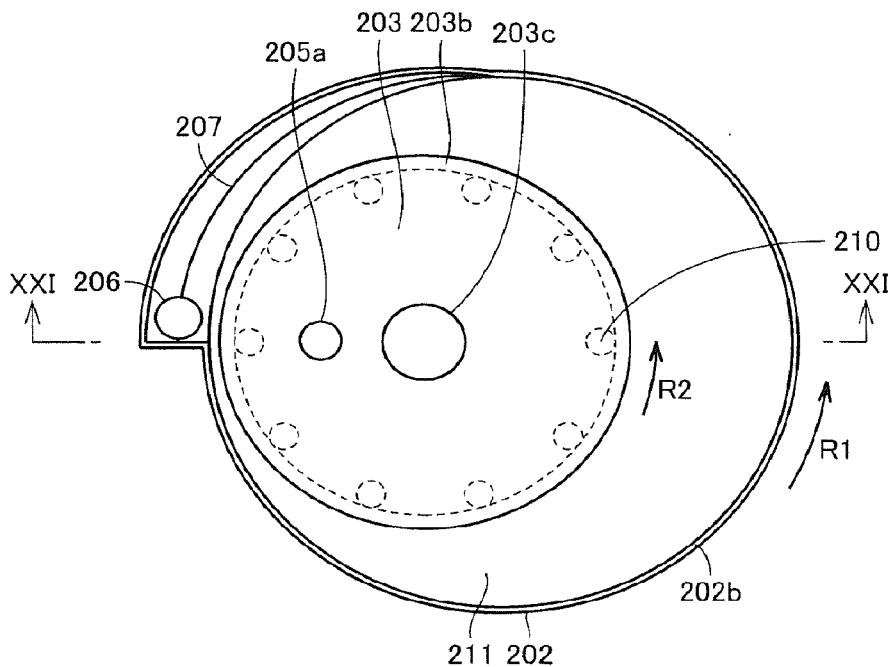
FIG. 22 is a schematic plan view of the green ball working apparatus of FIG. 21.

Referring to FIGS. 21 and 22, in a working apparatus 201 of green ball 210 of the present embodiment, insertion through hole 205a is formed in upper working plate 203 at the outer circumferential side relative to rotary shaft 203c. Insertion through hole 205a is formed at an upper flange 203d provided to extend at the outer circumferential side of rotary shaft 203c.

In a state where upper working plate 203 is located at first height position H1, green ball 210 is inserted into interior space 204 through insertion through hole 205a, as indicated by arrow A2 in FIG. 21. The remaining structure and working method of the present embodiment are similar to those of the eighth embodiment set forth above. Therefore, the same elements have the same reference characters allotted, and description thereof will not be repeated.

Since insertion through hole 205a is formed in upper working plate 203 at the outer circumferential side relative to rotary shaft 203c in working apparatus 201 of green ball 210 of the present embodiment, rotary shaft 203c of upper working plate 203 can be made thinner, allowing upper working plate 203 to be reduced in weight. Therefore, the rotational speed of upper working plate 203 can be improved. Thus, the mass productivity can be improved.

Tenth Embodiment

A green ball working apparatus according to a tenth embodiment of the present invention mainly differs from that of the ninth embodiment in the configuration of insertion through hole 205a.

Figure 23:
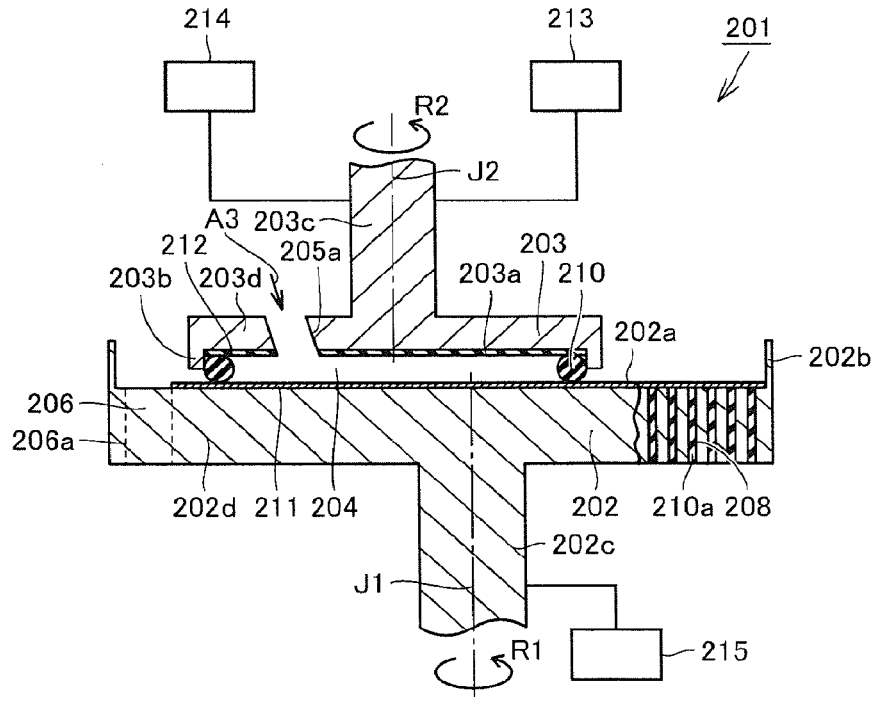
FIG. 23 is a schematic sectional view of a green ball working apparatus according to a tenth embodiment of the present invention with the upper working plate in a state located at the first height position.

Referring to FIG. 23, insertion through hole 205a in working apparatus 201 of green ball 210 according to the present embodiment is formed to extend oblique to first plane 202a.

In a state where upper working plate 203 is located at first height position H1, green ball 210 is inserted into interior space 204 through insertion through hole 205a, as indicated by arrow A3 in FIG. 21. The remaining structure and working method of the present embodiment are similar to those of the ninth embodiment set forth above. Therefore, the same elements have the same reference characters allotted, and description thereof will not be repeated.

Since insertion through hole 205a in working apparatus 201 of green ball 210 according to the present embodiment is formed to extend oblique relative to first plane 202a, green ball 210 is inserted into interior space 204 at an angle oblique to first plane 202a. Therefore, a green ball 210 inserted previously in interior space 204 is pushed by the next green ball 210 inserted into interior space 204 to move in the direction along first plane 202a. Green ball 210 inserted into interior space 204 readily moves as far as upper guide wall 203b. Therefore, the jamming of green ball 210 at the location between insertion through hole 205a and first plane 202a can be suppressed even in the case where insertion through hole 205a has a small diameter. Therefore, the inserting efficiency of green ball 210 can be improved. Thus, the mass productivity can be improved.

Eleventh Embodiment

A green ball working apparatus according to an eleventh embodiment of the present invention mainly differs from that of the eighth embodiment in the configuration of insertion through hole 205a.

Figure 24:
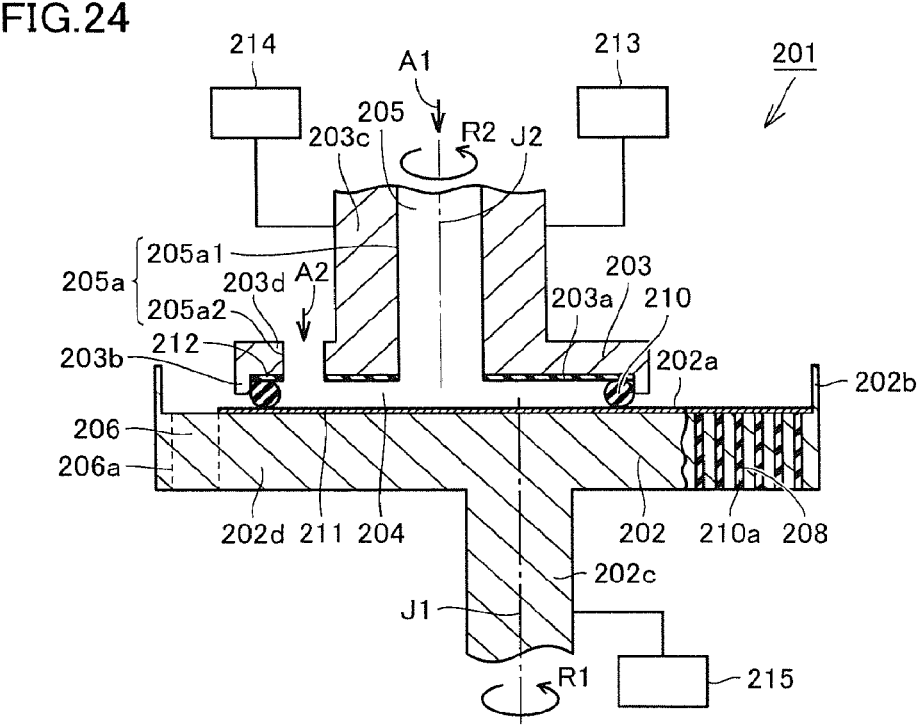
FIG. 24 is a schematic sectional view of a green ball working apparatus according to an eleventh embodiment of the present invention with the upper working plate in a state located at the first height position.
Figure 25:
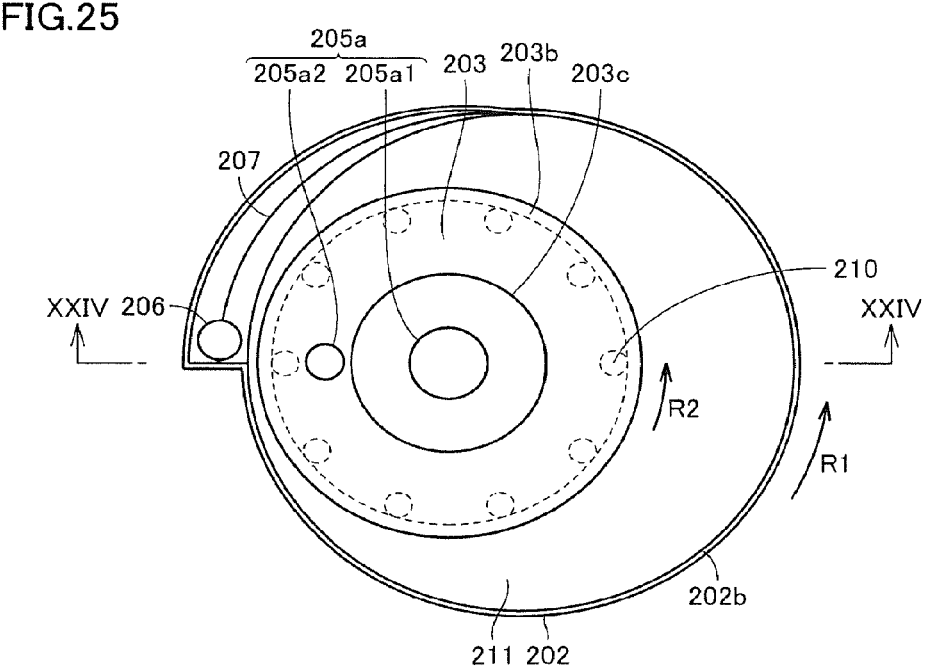
FIG. 25 is a schematic plan view of the green ball working apparatus of FIG. 24.

Referring to FIGS. 24 and 25, insertion through hole 205a in working apparatus 201 of green ball 210 according to the present embodiment includes a first through hole $205a_1$ formed in rotary shaft 203c of upper working plate 203, and a second through hole $205a_2$ formed at an outer circumferential side relative to rotary shaft 203c. First through hole $205a_1$ is formed in rotary shaft 203c. Second through hole $205a_2$ is formed at an upper flange 203d provided to expand at the outer circumferential side of rotary shaft 203c.

In a state where upper working plate 203 is located at first height position H1, green ball 210 is inserted into interior space 204 through first through hole $205a_1$ and second through hole $205a_2$. The remaining structure and working method of the present embodiment are similar to those of the eighth embodiment set forth above. Therefore, the same elements have the same reference characters allotted, and description thereof will not be repeated.

Since insertion through hole 205a in working apparatus 201 of green ball 210 according to the present embodiment includes a first through hole $205a_1$ formed in rotary shaft 203c of upper working plate 203, and a second through hole $205a_2$ formed at an outer circumferential side relative to rotary shaft 203c, a plurality of green balls 210 can be inserted into interior space 204 from both first through hole $205a_1$ and second through hole $205a_2$. Therefore, a plurality of green balls 210 can be inserted rapidly into interior space 204. Thus, the mass productivity can be improved.

Example 1

Experiments were carried out, actually executing green ball grinding according to procedures similar to those of the first to third embodiments set forth above to confirm the effect thereof. As a sample, a green ball having the sphericity of 100 μm obtained by molding raw material powder of silicon nitride was used. Steps S20-S40 were executed likewise with the first embodiment, using grinding apparatus 1 described in the first embodiment. Ten green balls were supplied to grinding apparatus 1. The rotating speed of first plate 10 was set at 20 rpm, and the rotating speed of the second plate was set at 250 rpm. The load $L_m$ was 3.2N per green ball. The time t of the repeating pitch of step S30 and step S40 was 1 second (load controlled).

Using a similar sample, steps S20-S40 were executed likewise with the second embodiment, using grinding apparatus 1 described in the first embodiment. Specific grinding conditions are set forth below. The distance $D_m$ between plate 10 and plate 20 at step S30 was −50 μm relative to the diameter of green ball 91. Distance $D_c$ between plate 10 and plate 20 at step S40 was +1.5 mm relative to the diameter of green ball 91 (distance controlled).

For a similar sample, steps S20-S40 were executed, likewise with the third embodiment, using grinding apparatus 1 described in the third embodiment. The configuration of plate 20 was set as set forth below. Greater distance region 21A was formed to occupy the ratio of 1/2 in the circumferential direction of second surface 21. In greater distance region 21A, a region occupying the ratio of 1/5 in the circumferential direction of second surface 21 had the distance gradually modified. The distance of the remaining region was constant. In the region where the distance is constant, the distance between first surface 11 and second surface 21 was set to be greater by 1.5 mm at the region other than greater distance region 21A (formation of inclined face).

For comparison, grinding was executed for a similar sample without distance controlled and load controlled, using grinding apparatus 1 described in the first embodiment (comparative example).

Figure 26:
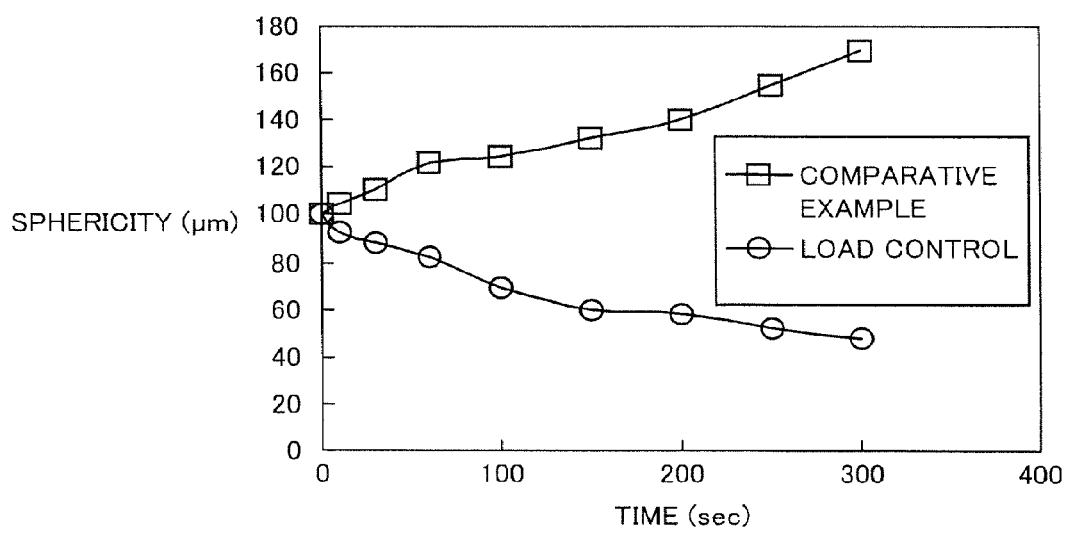
FIG. 26 represents the change in sphericity over time when the load is controlled.
Figure 27:
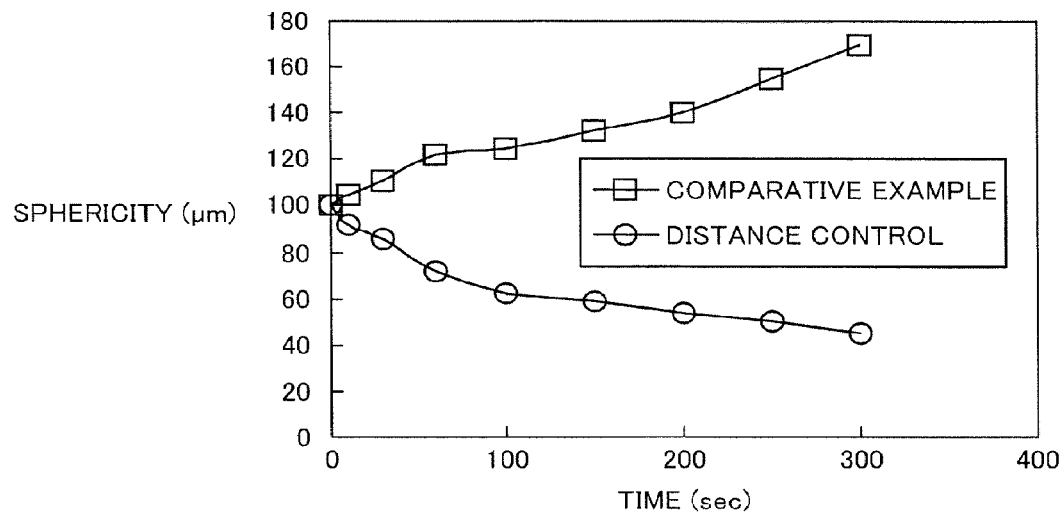
FIG. 27 represents the change in sphericity over time when the distance between the plates is controlled.
Figure 28:
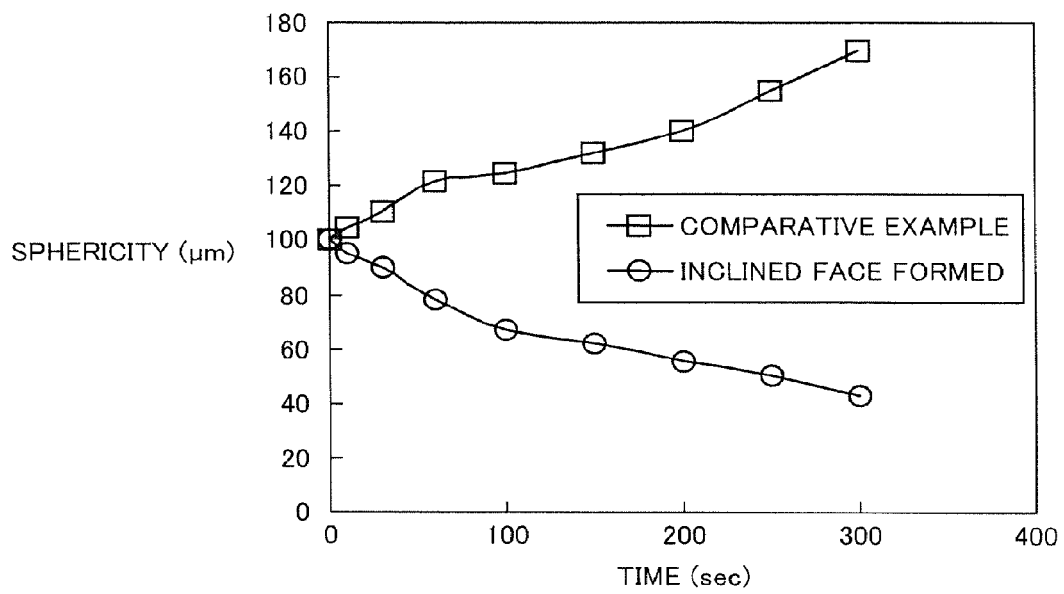
FIG. 28 represents the change in sphericity over time when a greater distance region is formed at the plate.

The results of the experiment will be described hereinafter. FIGS. 26, 27 and 28 represent the results when load control was performed, distance control was performed, and an inclined face was formed, respectively. In FIGS. 26-28, the time of elapse from starting grinding is plotted along the horizontal axis, whereas the sphericity is plotted along the vertical axis. As used herein, sphericity refers to, envisaging a spherical surface circumscribing the green ball, the maximum value of the radial distance in each equator plane between that spherical surface and each point on the surface of the green ball. Therefore, a smaller value represents higher sphericity. The results of the comparative examples are also shown in FIGS. 26-28.

In the comparative example referring to FIGS. 26-28, the sphericity is degraded over time in the range up to 300 seconds of the grinding time. In contrast, the sphericity is improved over time in the examples having load controlled, distance controlled, and an inclined face formed. In either of these cases, the sphericity was improved to approximately 4 times than the comparative example at the point in time of 300 seconds of the grinding time. Thus, it is confirmed that higher sphericity can be achieved according to the green ball grinding method of the present invention as compared to the conventional method.

In the case where the green ball grinding method of the present invention is carried out with only the load controlled when the sphericity of the green ball prior to grinding is low, excessive load may be applied to the green ball, leading to the possibility of the green ball being damaged. Therefore, position control conforming to the shape of the green ball may be carried out at the initial stage of working, and then proceed to the grinding step according to load control. Alternatively, grinding according to load control may be carried out at the initial stage of working, and then proceed to position control.

The green ball grinding method of the present invention is not limited to the above-described embodiments and examples in which both the first member (first plate) and the second member (second plate) of the grinding apparatus rotate. At least the second member (second plate) should rotate. Moreover, the first member may be an endless belt having a plane of linear movement, facing the second plate of the second member, instead of a plate.

Example 2

Experiments on studying the effect of the configuration of the plate and the ground particle removal mechanism on the advancement of clogging were carried out. For a sample, a green ball obtained by molding raw material powder of silicon nitride was employed. Ten of such green balls were supplied at the same time to a grinding apparatus having a configuration similar to that of grinding apparatus 101 described in the embodiments set forth above to perform grinding. The number of times of working processes performed before the working efficiency was degraded by 90% from the state when grinding was started was studied.

The grinding apparatuses employed were: grinding apparatus 101 of the fourth embodiment having a ground particle removal mechanism absent of a suction member 140, and using a grindstone of diamond #230 as grinding layer 110A (comparative example); the grinding apparatus of the comparative example including suction member 140 similar to that set forth in the fourth embodiment (Example A); the grinding apparatus of Example A having grinding layer 110A changed to a lattice member (wire mesh), and including a through hole formed at first plate 110 similar to that set forth in the seventh embodiment (Example B); the grinding apparatus of Example B employing a cleaning member 150 and a drying member 152 similar to those set forth in the sixth embodiment, instead of suction member 140 (Example C); and the grinding apparatus of Example C having a gas spraying member 160 and suction member 140 similar to those set forth in the seventh embodiment arranged, instead of cleaning member 150 and drying member 152 (Example D).

The rotating speed of second plate 120 was set at 250 rpm, and the rotating speed of first plate 110 was set at 20 rpm. The lattice member employed as grinding layer 110A had an aperture of 150 μm. The results of the experiments are shown in Table 1 set forth below.

TABLE 1

| | Comparative Example | Example A | Example B | Example C | Example D |
|---|---|---|---|---|---|
| Grinding Layer | Grindstone | Grindstone | Lattice Member | Lattice Member | Lattice Member |
| Hole of First Plate | None | None | Through Hole | Through Hole | Through Hole |
| Ground particle removal mechanism | None | Suction Member | Suction Member | Cleaning Member, Drying Member | Gas Spraying Member, Suction Member |
| Number of times of working processes (Times) | 10 | 50 | 90 | 130 | 130 |

It is appreciated from Table 1 that, according to the grinding apparatus of Example A added with a suction member that is the ground particle removal mechanism with respect to the grinding apparatus of the comparative example, the number of times of working processes performed before the working efficiency was degraded by 90% from the state when grinding was started was improved up to 5 times that of the grinding apparatus of the comparative example. Further, according to Example B corresponding to grinding layer 110A of Example A changed to a lattice member and having a through hole formed at first plate 110, the number of times of working processes was further improved to 18 times. The aforementioned number of times of working processes was further improved by the modification to the combination of a cleaning member and drying member, instead of the suction member, or the combination of a gas spraying member and suction member (refer to FIG. 11).

It was confirmed by the results that degradation in the grinding efficiency can be suppressed and green ball grinding can be executed efficiently according to the green ball grinding apparatus of the present invention.

Example 3

Experiments of identifying an appropriate size of the aperture when the lattice member was employed as the grinding face were carried out. The samples and grinding conditions were similar to those of the experiments in EXAMPLE 2. Using grinding apparatuses similar to those of Examples B-D in EXAMPLE 2 set forth above with the aperture of the lattice member varied at a plurality of sizes up to 350 μm, the number of times of working processes performed before the working efficiency was degraded by 90% from the state when grinding was started was studied.

Figure 29:
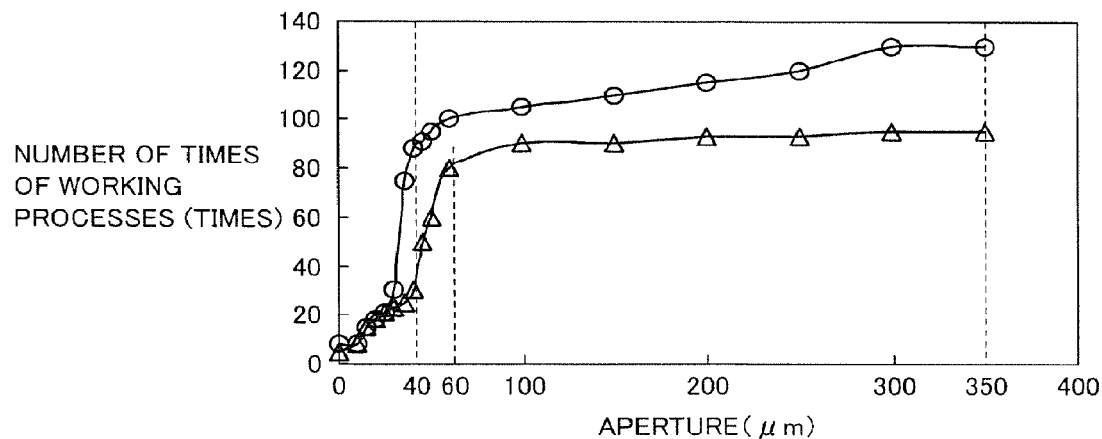
FIG. 29 represents the relationship between the size of the aperture in the lattice member and the number of times of working processes.

The results of the experiments are described hereinafter. As a result of the experiments, the relationship between the aperture size and the number of times of working processes was similar according to the grinding apparatuses of Examples C and D, but differed from the grinding apparatus of Example B. In FIG. 29, the experiment results according to the grinding apparatus of Example B are indicated by a triangle, whereas the experiment results according to the grinding apparatus of Examples C and D are indicated by a circle. In FIG. 29, the horizontal axis represents the aperture size in the lattice member, whereas the vertical axis represents the number of times of working processes performed before the working efficiency was degraded by 90% from the state when grinding was started.

It is appreciated from FIG. 29 that the number of times of working processes was improved drastically as a function of a larger aperture when the aperture is less than 60 μm according to the grinding apparatus of Example B, i.e. a grinding apparatus employing a suction member as the ground particle removal mechanism. The number of times of working processes was improved mildly when the aperture size exceeds 60 urn. Based on these results, it is preferable to set the aperture of the lattice member greater than or equal to 60 μm in the grinding apparatus of the present invention employing the suction member as the ground particle removal mechanism.

According to the grinding apparatuses of Examples C and D, i.e. a grinding apparatus employing the combination of a cleaning member and drying member as the ground particle removal mechanism, and a grinding apparatus employing the combination of a gas spraying member and suction member that face each other with the first plate therebetween, the number of times of working processes was improved drastically as a function of a larger aperture when the aperture is less than 40 μm. Improvement in the number of times of working processes became mild when the aperture size exceeds 40 μm. Based on these results, it is preferable to set the aperture of the lattice member greater than or equal to 40 μm in the grinding apparatus of the present invention employing the combination of a cleaning member and drying member as the ground particle removal mechanism, and a grinding apparatus employing the combination of a gas spraying member and suction member that face each other with the first plate therebetween. The reason why the lower limit of the preferable aperture size according to the grinding apparatuses of Examples C and D became smaller as compared to the grinding apparatus of Example B is probably due to the fact that the effect of suppressing clogging by virtue of the combination of a cleaning member and drying member as well as the combination of a gas spraying member and suction member was higher, as compared to the suction member.

Green ball grinding was rendered difficult when the aperture size exceeded 350 μm according to each grinding apparatus of Examples B-D. It can therefore be said that the aperture of the lattice member is preferably less than or equal to 350 μm.

Example 4

EXAMPLE 4 of the present invention will be described hereinafter.

Grinding a plurality of green balls was carried out according to the green ball working apparatus of the eighth embodiment of the present invention and a conventional green ball working apparatus. The time required for working and the number of times of working processes were compared between the green ball working apparatus of the eighth embodiment of the present invention and the conventional green ball working apparatus. The green ball working apparatus according to the eighth embodiment of the present invention was employed in the present example. A conventional green ball working apparatus absent of the insertion section and discharge section of the present invention was employed in the comparative example.

In the present example and comparative example, ten green balls were used for each one grinding work. The cycle of sandwiching ten green balls between lower working plate 202 and upper working plate 203, followed by grinding, up to the discharge of the ten green balls subjected to grinding from lower working plate 202 was taken as one working process. The grinding was carried out continuously until 30 times of the working processes ended.

Figure 30:
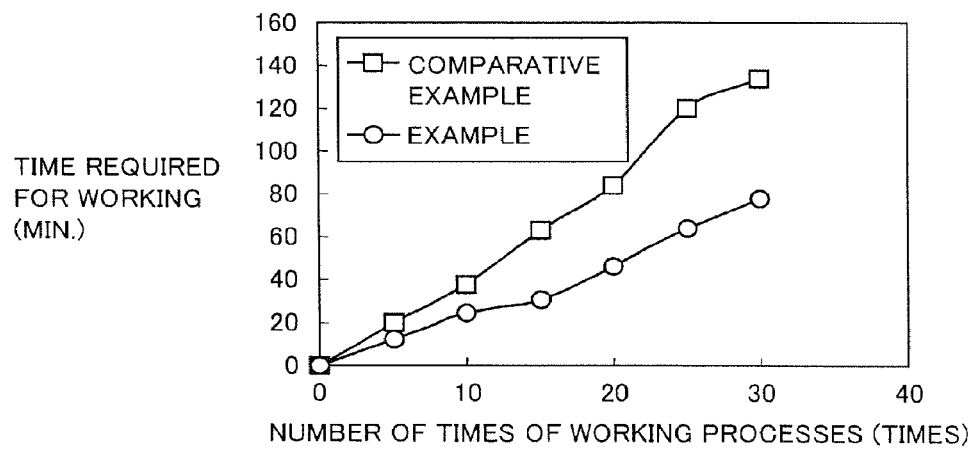
FIG. 30 represents the relationship between the required working time and the number of times of working processes for an example of the present invention and a comparative example.

The results are shown in FIG. 30. The unit of the required time of working was minutes, and the unit of the number of times of working processes was times. It is appreciated from FIG. 30 that the time required for working was always shorter in the example than the comparative example according to the same number of times of working processes. At the point in time when 30 times of the working processes ended, the time required for working could be shortened in the example to approximately half that of the comparative example.

Each of the embodiments set forth above can be combined appropriately.

It is to be understood that the embodiments and examples disclosed herein are only by way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST 1 grinding apparatus; 10 first plate; 10A grinding layer; 11 first surface; 12 first shaft; 20 second plate; 20A holding layer; 21 second surface; 21A greater distance region; 22 retainer; 23 inner wall; 24 second shaft; 31 bearing; 32 first holding member; 33 second holding member; 41 distance changing region; 91 green ball; 101 grinding apparatus; 110 first plate; 110A grinding layer; 111 first surface; 112 first shaft; 113 mesh; 114 hole; 120 second plate; 120A holding layer; 121 second surface; 122 retainer; 123 inner wall; 124 second shaft; 131 bearing; 132 first holding member; 133 second holding member; 140 suction member; 141 suction hole; 150 cleaning member; 151 discharge hole; 152 drying member; 153 spray hole; 160 gas spraying member; 161 gas spraying hole; 191 green ball; 201 working apparatus; 202 lower working plate; 202a first plane; 202b lower guide wall; 202c lower rotary shaft; 202d lower flange; 203 upper working plate; 203a second plane; 203b upper guide wall; 203c rotary shaft; 203d upper flange; 204 interior space; 205 insertion section; 205a insertion through hole; $205a_1$ first through hole; $205a_2$ second through hole; 206 discharge section; 206a discharge through hole; 207 valley; 208 hole; 210 green ball; 210a ground particles; 211 rough surface constituent member; 212 resilient plate; 213 first rotation drive device; 214 lift device; 215 second rotation drive device; H1 first height position; H2 second height position.

The invention claimed is:

1. A grinding apparatus for carrying out grinding of a green ball between a first member and second member
said first member having a first surface,
said second member having a second surface facing said first surface,
said green ball being located between said first surface and said second surface during grinding,
said second surface has a first region and a second region constituting an entirety of the second surface, said first region being spaced apart from said first surface by a first distance, and said second region is a sloped region wherein a distance between the first member and the second member is greater than said first distance and increases along a direction extending away from said first region,
wherein the first region defines a first surface area corresponding to the entire first region, the second region defines a second surface area corresponding to the entire second region, and the first surface area is approximately the same as the second surface area, and
the grinding apparatus is configured to grind said green ball, wherein when said green ball is between said first surface and said first region said green ball experiences a first load, and when said green ball is between said first surface and said second region said green ball experiences a second load lower than said first load, wherein said second load is substantially zero.

* * * * *